(12) United States Patent
Sperry et al.

(10) Patent No.: US 6,234,777 B1
(45) Date of Patent: May 22, 2001

(54) AUTOMATED CUSHION FORMING SYSTEM

(75) Inventors: Charles R. Sperry, Springfield, VT (US); Vincent A. Piucci, Jr., Spencer, MA (US); Todd A. Hanna, Richmond, VA (US)

(73) Assignee: Carpenter Co., Richmond, VA (US)

( * ) Notice: Subject to any disclaimer, the term of this patent is extended or adjusted under 35 U.S.C. 154(b) by 0 days.

(21) Appl. No.: 09/168,431

(22) Filed: Oct. 7, 1998

(51) Int. Cl.⁷ ........................................................ B65B 9/06
(52) U.S. Cl. ........................... 425/46; 425/112; 425/115; 425/224; 53/282; 53/477; 53/480
(58) Field of Search .................................. 425/112, 115, 425/224, 46; 264/46.6; 53/282, 451, 469, 471, 477, 479, 480; 492/46

(56) References Cited

U.S. PATENT DOCUMENTS

| | | | |
|---|---|---|---|
| 2,259,866 | * 10/1941 | Stokes | 53/410 |
| 2,897,641 | 8/1959 | Simon et al. | 53/449 |
| 2,928,216 | * 3/1960 | Orsini | 53/449 |
| 3,091,811 | 6/1963 | Hackert | 264/213 |
| 3,382,642 | 5/1968 | Shaw | 53/434 |
| 3,389,195 | 6/1968 | Gianakos et al. | 264/45.4 |
| 3,485,347 | 12/1969 | McGill et al. | 206/524 |
| 3,545,983 | 12/1970 | Woods | 426/395 |
| 3,566,448 | 3/1971 | Ernst | 425/4 R |
| 3,581,876 | 6/1971 | Keith | 198/626.6 |
| 3,634,565 | 1/1972 | Schaerer | 264/54 |
| 3,644,606 | 2/1972 | Auge et al. | 264/46.2 |
| 3,735,551 | 5/1973 | Pratt | 53/433 |
| 3,775,522 | 11/1973 | Auge | 264/46.2 |
| 3,906,068 | 9/1975 | Hanusa | 264/51 |
| 3,987,602 | 10/1976 | Stahl | 53/440 |
| 4,196,160 | 4/1980 | Sperry | 264/40.4 |
| 4,200,603 | * 4/1980 | Raffel et al. | 425/4 R |
| 4,278,624 | 7/1981 | Kornylak | 264/37.16 |
| 4,422,988 | 12/1983 | Kornylak | 264/40.3 |
| 4,604,854 | 8/1986 | Andreas | 53/552 |
| 4,637,199 | 1/1987 | Steck et al. | 53/451 |
| 4,674,268 | 6/1987 | Gavronsky et al. | 53/468 |
| 4,800,708 | 1/1989 | Sperry | 53/449 |
| 4,854,109 | 8/1989 | Pinarer et al. | 53/397 |
| 4,898,327 | 2/1990 | Sperry et al. | 239/1 |

(List continued on next page.)

OTHER PUBLICATIONS

Internet Advertisement for Packaging and Shipping Group, Inc. (2 pgs.), entitled "Liquid Polyurethane Foam Products"; date unknown.

*Primary Examiner*—Harold Pyon
*Assistant Examiner*—Donald Heckenberg
(74) *Attorney, Agent, or Firm*—Smith, Gambrell & Russell

(57) ABSTRACT

A foam bag cushion forming system for forming foam bag cushions with a vertical side edge sealer that forms vertical side edge seals in the film material with the foam introduction preferably occurring after the downstream side seal is formed, before the upstream side edge seal is formed, and while the film material is being shifted from one to the other. An upper edge sealer operates to seal the upper end of the film material downstream from the dispenser and preferably also downstream from the side edge sealer. Through operation of the end and side edge sealers and the foam dispenser, a foam bag cushion chain is formed. A bag cushion moving and confinement assembly is positioned to receive the bag chain and features two elongated members defining a bag cushion confinement space between them. At least one of the elongated members supports or represents a bag cushion movement device (e.g., a conveyor) which acts to pull the preferably still interlinked bag cushions along the elongated members until the foam has had sufficient time to cure. In one embodiment, die impressions are supported on at least one of the two elongated members and extend into the foam material to form three dimensional foam cushions. The upper edge sealer is independently adjustable so as to vary bag cushion height while the moving device and side edge sealer can be controlled to form the desired bag length between side edge seal formation.

29 Claims, 17 Drawing Sheets

U.S. PATENT DOCUMENTS

| | | | |
|---|---|---|---|
| 4,938,003 | 7/1990 | Seppala | 53/171 |
| 4,938,007 | 7/1990 | Sperry | 53/449 |
| 4,999,975 | 3/1991 | Willden et al. | 53/451 |
| 5,027,583 | 7/1991 | Chelak | 53/451 |
| 5,112,632 | 5/1992 | Meli et al. | 426/392 |
| 5,139,151 | 8/1992 | Chelak | 206/523 |
| 5,255,847 | 10/1993 | Sperry et al. | 239/112 |
| 5,376,219 | 12/1994 | Sperry et al. | 156/515 |
| 5,473,866 | 12/1995 | Maglecic et al. | 53/511 |
| 5,527,172 | 6/1996 | Graham, Jr. | 425/89 |
| 5,575,435 | 11/1996 | Sperry et al. | 242/421.4 |
| 5,679,208 | 10/1997 | Sperry et al. | 156/515 |
| 5,727,370 | 3/1998 | Sperry | 53/472 |
| 5,794,406 | 8/1998 | Reichental et al. | 53/410 |

\* cited by examiner

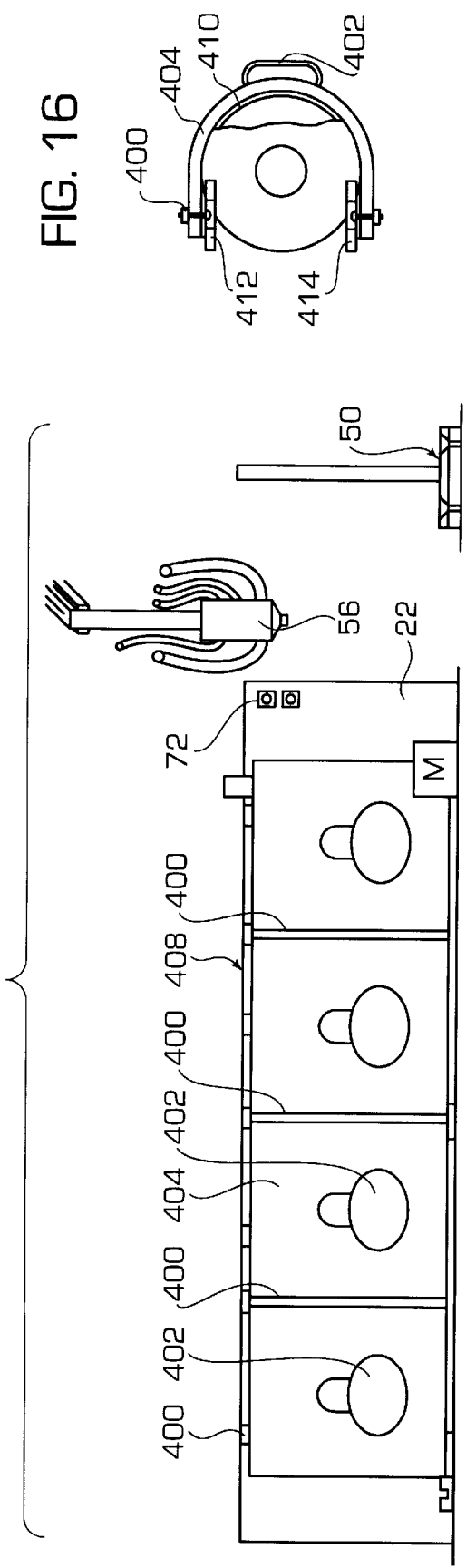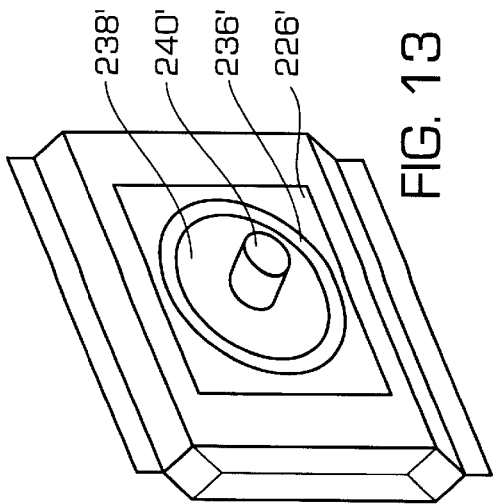

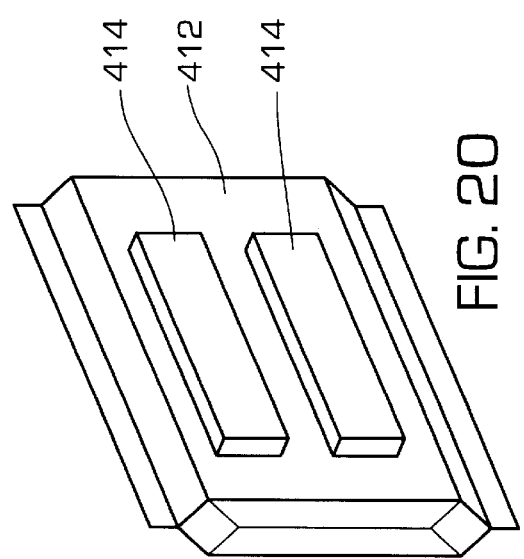
FIG. 20
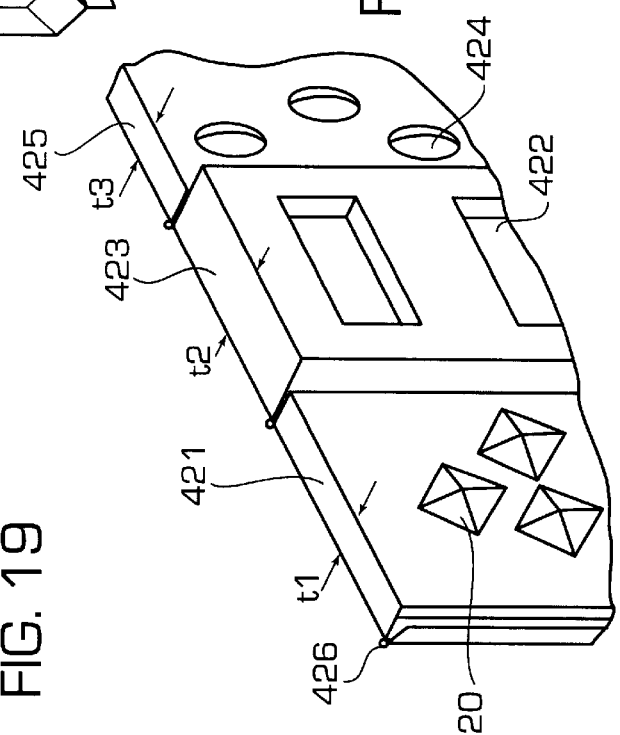
FIG. 21
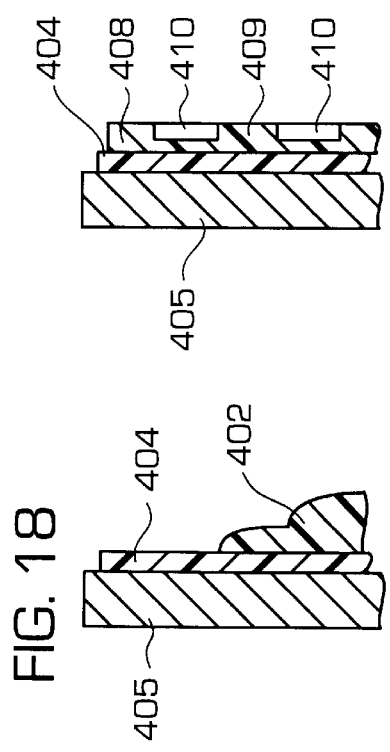
FIG. 19
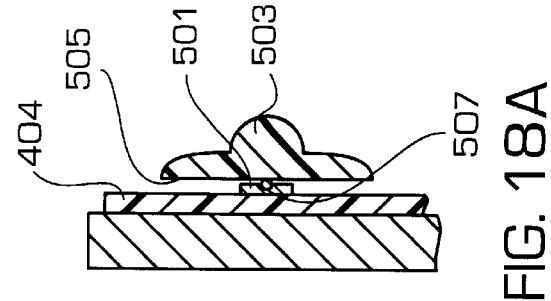
FIG. 18
FIG. 18A

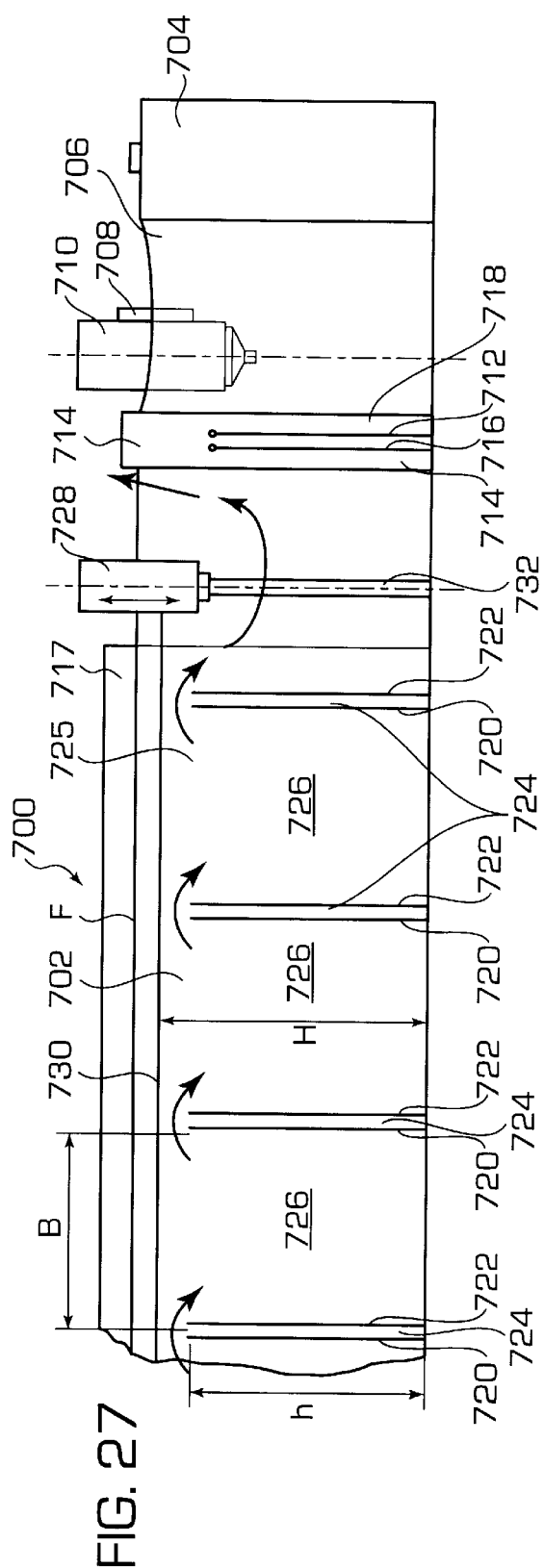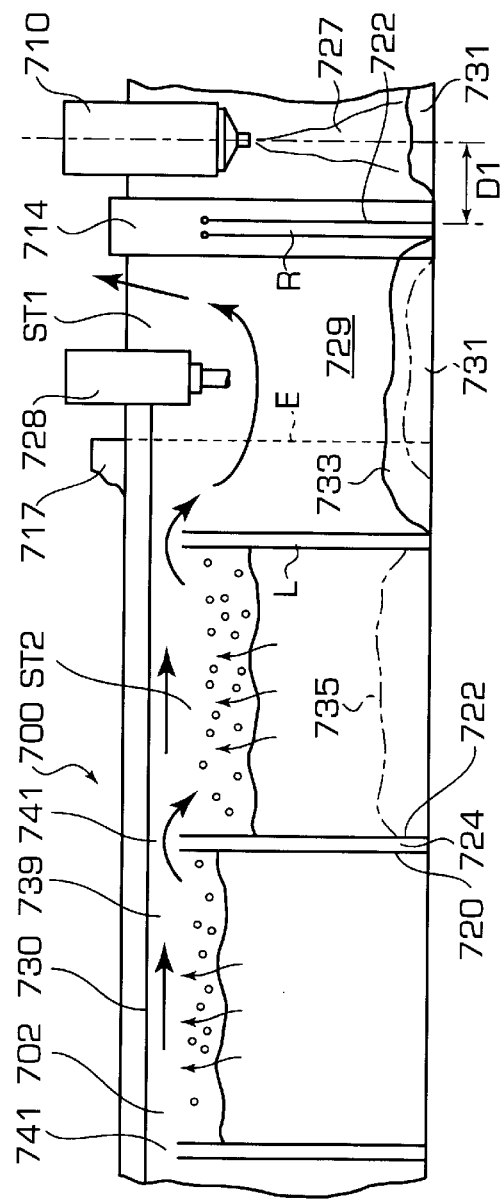

AUTOMATED CUSHION FORMING SYSTEM

FIELD OF THE INVENTION

The present invention is directed at an automated cushion forming system and method of using the same, and preferably an automated foam bag cushion forming assembly with shape forming means that in one embodiment includes an automated die impression forming system to form foam cushion bags having impressions and/or protrusions making the cushions particularly well suited for use as a product packing cushion or the like.

BACKGROUND OF THE INVENTION

A variety of systems have been developed for forming various shaped cushion bodies by introducing an initially liquid or creamy material into a system and controlling the material's external environment during an expansion of the material until the material sufficiently cures or sets into its final shape. Foamable synthetic resins, such as polyurethane, are representative of material commonly used in the production of foamed cushion bodies. Amongst these systems, a great deal of work has been carried out in forming large foam buns which, after some initial surface planing, are often sent to locations where the foam bun is further cut and processed into relatively smaller products such as mattress pads, packing material, etc. These foam buns are often formed by injecting the foam material onto an underlying moving sheet which passes through a confining structure such as a pair of opposed side conveyors or a pair of opposed side walls forming a trough like structure. To lessen the friction between the side walls and the rising foam material so as to avoid a higher central area relative to the foam bun's side walls (and thus added waste when squaring off the foam block), the underlying sheet is often curled or bent up along its side edges so as to partially run along the side walls. In addition, many of the foam bun production systems utilize opposing side sheets positioned between the foam and the side walls to reduce friction and in some instances to help pull up the foam on its sides. Examples of foam bun production systems can be seen in U.S. Pat. No. 5,527,172 assigned to Carpenter Company of Richmond, Virginia US, as well as U.S. Pat. Nos. 3,091,811 and 3,906,068.

It is also known in the industry to form foam cushion products in a final state directly by injecting the foam material into a mold whereupon the foam material expands and assumes the shape of the desired product. An example of an automated technique for forming foam cushion products can be seen in U.S. Pat. No. 3,566,448 wherein a pair of horizontally-oriented conveyors comprising a series of partial molds are rotated so as to have the partial molds come into aligned contact shortly after a lower cup shaped mold is partially filled with the liquid foam material. The '448 patent also describes passing sheet material between the molds and foam to keep the molds in a clean state as well as a side shape assistance conveyor.

Other non-automated molding processes using casts or molds have also been used in the industry to form preformed foam packing products which are sent to various manufacturers for use in protecting products being sent out to customers.

The above described prior art systems are not, however, applicable to bag cushion forming and thus fail to provide an automated foam bag cushion production system that can provide formed or shaped foam bag cushions which have inherent benefits such as providing protection from foam contact to products to be shipped and handlers.

There has also been activity in developing automatic cushion bag forming machines such as that represented by U.S. Ser. No. 09/076,087 filed on May 12, 1998, and assigned to Carpenter Company, which is incorporated by reference herein in its entirety, and which describes a method and apparatus for forming sealed foam bag cushions with venting. The individual foam cushions output by the bag forming machine have particular utility in the packing industry in that both the product and the person ib handling the bag can avoid direct contact with the rather sticky foam material.

There has also been utilized heretofore in the industry a foam bag cushion production assembly that includes a foam bag production device having similarities to that described in U.S. Pat. No. 5,679,208 which operates to produce a series of independent, completely sealed (except for venting) foam bag cushions. This foam bag cushion production device is suspended high off the ground so that each of the resultant, independent foam bag cushions drops from the device into a space between a pair of vertically running conveyors and is then brought down to floor level. This system requires an extensive surrounding support network which occupies a great deal of space and is rather cumbersome and complex. In addition, because this system has a film feed structure that imposes an essentially fixed length output, adjustments in bag size are generally limited to height adjustments which relates to the amount of film fed into the bag forming device. Still further, this earlier used system injects a centralized shot of foam material which has to not only expand upward, but also outward to a considerable extent before reaching the side edges of the fixed length bag. This shot positioning is detrimental to high quality foam output both from the standpoint of pouring new foam onto earlier injected foam in a further advanced state of rising and also from the standpoint that foam yield is generally improved when essentially only vertical rising is involved.

The above noted previously relied upon system also does not provide a means for forming particular impressions or protrusions in the resultant foam bag cushion and thus has limited applicability. Also, this earlier used system, in completely forming, sealing, and separating the bag before introduction into the conveyor, represents a system that increases the possibility of earlier developed foam cells being crushed due to the delay in time between when the foam is first input into the bag and when it finally is placed between the vertical conveyors. The complete formation and separation of the bag before introduction into the downstream conveyor system in the prior system, also can lead to a relatively high processing time and thus does not represent a highly efficient system, particularly when considering that many manufacturers desire (but typically cannot satisfy) their foam cushion production output to conform to or coincide with the level of products being produced to be shipped out with foam bag cushion packing. For example, many manufacturers output products at a level which requires in excess of 25,000–50,000 cushions per shift and thus any inefficiency in producing an appropriate number of foam bag cushions is multiplied many times over by the end of the shift.

In the field of preformed and shaped foam cushion molding, a more typical prior art technique for forming shaped foam cushions is wherein foam cushions are produced by placing or dropping a completed, filled and separated bag into a die impression box having a wood die member or the like at the bottom. The cover of the box is then locked shut so that the expanding bag conforms to the contours of the box and the impression die at the bottom of the box. While some systems have been developed placing a plurality of boxes on a turntable so that a previously filled box returns back to a starting point at or closer to the time of completed rising, these systems are still highly labor intensive from, for example, the standpoint of an operator typically having to insert the cushion, close and lock the box, open the box and then remove the cushion. Also, due to the labor intensity and size requirements of such a system, preformed foam cushions are often made off-site and shipped to the product production location requiring large storage requirements and added expense.

SUMMARY OF THE INVENTION

The present invention is directed at an automated foam bag cushion production assembly that is highly efficient in its production of foam bags so that a manufacturer can more easily meet production demands for foam bag cushions. Also, the present invention is designed as a lightweight system with a minimization of component parts such that users of the device have greater versatility in positioning the device (e.g., a relatively lightweight system like the present invention can be placed on a mezzanine platform so that its output end coincides with the output end of a product manufacturing device for quick and easy packing). The present invention also provides a highly versatile system which allows for shaped foam bag cushions to be produced in an automated fashion which includes embodiments having shape forming die impressions in a wide variety of possible shapes and that are easily changed to provide the desired foam bag cushion configuration, which often represents a product conforming configuration for purposes such as packing. The present invention also provides a system that is highly versatile with respect to forming foam bag cushions of different lengths and heights to suit a wide assortment of bag size requirements. For example, the length of the bag formed with the present invention can be easily adjusted by controlled adjustments in the time of operation and speed of the moving means (e.g., a fixed speed such as 12 inches/second or varying speed conveyor system such as one with a range of 6 inches/second to 24 inches/second) to feed out a desired length of film material between the last formed vertical side edge seal and a to-be-formed vertical side edge seal. Also, the height of the bag can be easily adjusted by adjusting the height of an upper edge sealer up or down beneath the uppermost edge of the film material and the lower region of the film material (e.g. a shaft supported slidable roller with upper edge seal support)

Through use of a chain of non-separated bags, the moving means, which preferably also functions as a component of the bag cushion shape defining means provides the film material feeding means that feeds the film through the foam dispensing, venting and sealing systems since the film material is continuous with respect to the downstream already formed bags. For example, a continuous film material and bag cushion combination can extend from a supply roll source of preferably C-fold film material to a downstream completed and set foam bag cushion. The bag chain thus allows for the moving means to unwind the supply roll of C-fold film or a supply of flat film material with appropriate guiding means to achieve a C-fold arrangement prior to passing opened up C-fold film material under a dispenser.

In addition, the present invention, through control of the film material feed out and the dispenser's form material output, is able to provide a substantially continuous and equal height bead or layer of form material at the bottom of the C-fold film so as to lessen side expansion requirements and the degree of contact between newly dispensed foam and earlier dispensed foam. In this regard, in one preferred embodiment of the invention, the foam material dispenser's output is positioned closely adjacent to a side seal forming device such that the bead of dispensed foam can extend essentially across the entire length of the bag cushion (from side-edge-seal to side edge seal). The present invention thus features an automated cushion forming system which can produce sealed foam bag cushions with or without molded impressions formed in one or more sides of the bag cushion.

One embodiment of the invention features a C-fold poly film supply, mounted vertically with the free edge sheets up. Also provided is a foam dispenser preferably of the type described in PCT Appl. No. PCT/US98/06508 which is incorporated herein by reference in its entirety. The invention also features an upper edge sealing means preferably of a heat cartridge type like that described in the aforementioned U.S. Ser. No. 09/076,087. In addition, a preferably vertical side edge sealing means is provided to close the film and form foam bag cushions arranged in an interlocked cushion bag chain. A reciprocating "seal-a-meal" type assembly is preferred for providing the side edge seals. The cushion bags are moved through the foam bag forming system preferably with at least one moving means such as a conveyor. For example, a single conveyor can be used as the moving means with the conveyor, preferably with the assistance of a conveyor sheet interior support, providing a bag shape conformance function through a degree of compressive force on the cushions as the cushions expand out against the conveyor and another juxtaposed member such as a stationary member or another conveyor or the like. In one embodiment, the juxtaposed, parallel stationary member is a backboard or wall with either the parallel stationary member, the conveyor or both being adjustable to vary the space between the backboard and conveyor. Also optionally provided is a vertical or side edge cut-off device preferably having a hot-wire cutting device similar to that used in sealing the vertical side edges of the bag cushions.

A preferred embodiment of the invention also features vent forming means for exhausting reaction gases produced during the rapid rise of the foam material in the bag. The venting and upper edge sealing functions are carried out in one embodiment in conjunction with a sealing and vent means support roller assembly that helps place the earlier diverted upper film sheet halves back into contact, at which point the upper edge sealer operates to form a preferably continuous upper seal in the two film sheet sections and the vent former operates to provide (e.g., melt or cut) a vent hole in the upper region of the bag being formed below the upper edge seal. In another embodiment, the vertical edge sealer has a shorter length than the distance between the upper edge seal and the fold line of the C-fold film. Thus a series of bags are formed each having a gas communication channel formed in a non-sealed space between the vertical edge seal bead(s) of an adjacent pair of bags in the chain and the transversely extending upper edge seal. In a preferred embodiment, the vertical side edge seal is continuous and has a vertical height made less than the vertical height position of the formed bag as represented by the upper edge seal. With this arrangement the exhaust gas is channeled from bag to bag along the chain of bags under the continuous seal until the gas stream reaches the still yet to be completely formed bag whereupon the gas is free to exhaust out the non-sealed upper area of the not yet completed bag. This arrangement helps avoid the loss of foam material since any foam spray mixed in with the exhaust gas is directed into the next bag in line and generally retained in that bag. This arrangement also lessens the degree of external foam spray out away from the system to lessen the cleaning requirements of system components coated with exhausted foam spray.

Also, to help in assuring that the two film sheet sections are sufficiently open prior to travel past (under) the foam dispenser, the present invention features film sheet diversion means such as a wedge member supported on the upstream side of the dispenser or a pair of diverters (e.g., rollers) extending from a dispenser support structure between the static clinging film sheet sections to break the sections apart and into an open foam reception state.

In operating an embodiment of the invention having a side edge sealer that does not move together with the conveyor, the conveyor operates to index the film the distance of one foam cushion, which distance is dependant on the desired length of the cushion bag being produced at that particular time in the process (e.g., a series of standard sizes or a string of different lengths). Depending upon the length of the bag being produced, and the location of the vertical side edge sealer with respect to the conveyor or other confinement means, the indexing may involve a first stage whereupon the just sealed bag is fed downstream until it is completely within the space defining means (e.g., a pair of spaced conveyors with the bag a half an inch or so downstream from the upstream edge of the conveyors) and then a second stage wherein the connected film and chain of bags is further indexed downstream to align the vertical edge sealer at the desired bag length location. For shorter bags or for bags that conform in length to the distance between the desired initial bag confinement location and the vertical edge sealer, a non-staged or continuous indexing operation can be carried out. The speed of conveyance of the just formed bag cushion from the time of dispensing is sufficiently fast in relation to the distance from the dispenser point to the upstream end of the moving means, to ensure that the filled bag reaches the confining means before it has expanded to a state which would involve compressing and collapsing already formed foam cells (as opposed to foam cell expansion against the confining means after already assuming a confinement position location with respect to the confinement means). The vertical side edge sealer, upper edge sealer, the dispenser and the confinement means can each be made adjustable in the direction of film and bag cushion movement, or any one or any combination of these elements can be made adjustable along the direction of film travel to suit the desired parameters (e.g., providing for a coinciding index length between placement of the new foam bag sufficiently in the confinement means and the bag length being formed). The dispenser preferably shoots foam inside the open end of the C-fold film during a period when the film is being indexed. The volume of foam material output is set so as to provide a substantially equal height layer or bead of foam material over a large percentage of the length of the formed or still being formed bag (e.g., within one to three inches of each of a bag's two side edges). In this way, the degree of side expansion in the foam and the new foam on old foam contact is minimized. As the film passes downstream from the dispenser, the upper edge sealer closes the top edge of the C-fold film. The upper edge sealer can be positioned either upstream or downstream from the vertical side edge sealer, but from the standpoint of pacing the dispenser output as close to the side edge seal as possible to avoid side expansion and foam on foam contact, it is preferable to place the vertical side edge sealer between the dispenser's outlet and the upper edge sealer as opposed to the upper edge sealer being between the dispenser's outlet and the vertical side edge sealer.

Once the system has finished indexing out the desired length of film, the vertical side edge sealer closes the back end of the cushion. Depending on the curing time of the foam and the length of the conveyor system, the system may go into an extended dwell time period after the bag chain is shifted to move the recently filled and next in line to be confined bag into a confinement location, wherein the foam in the most recently confined bag is allowed to expand out into conformance with the limiting backboard and conveyor so as to form a shaped cushion bag having two flat sides defined by the conveyor and backboard and a thickness defined by the separation distance between the backboard and conveyor and a periphery defined by the expanded bag's periphery. The separation distance is preferably between ¼ inch to one foot with a range of ½ to 1 inch being a preferred range for cushions without die impressions formed therein and 1 to 6 inches being a preferred range for many uses of cushions having die impressions formed therein as discussed below.

The length of the dwell time is the result of the number of cushions that can be held captive between the conveyor and backboard so that each cushion will have a total full contact period sufficient for ensuring the foam has set up or risen and cured sufficiently as not to deform following release the system due to not being sufficiently cured. A one minute contact period is sufficient for many situations. For example, if the backboard and conveyor are long enough to fully capture 3 foam cushions, the system will index every 20 seconds so that each cushion will have at least 20 seconds of dwell time at each of three stations for a total period of at least one minute.

When the system completes an indexing operation, a completed cushion comes out of the end and preferably a vertical cut-off severs and separates the exiting cushion along the vertical seal that was earlier made.

In an alternate embodiment of the present invention, the foam bag cushion forming system has three dimensional shape forming means to impose a three dimensional shape in the previously planar or flat cushion surface(s). Once a filled cushion is indexed into the conveyor system, a retractable shape (in the form of blocks or other shapes) is inserted though a series of holes in the backboard. In the first station, the foam will rise rapidly to assume the conditioned state during that dwell time. Immediately prior to indexing, the shapes are retracted, and the cushion moved to the next station where a similar shaped member is inserted in the corresponding backboard hole to ensure curing to the desired formed shape. A similar set up is provided at each station or at least at a sufficient number of stations which allows sufficient set up of the foam to avoid any configuration change downstream. In this way a molded cushion bag is provided (or molded cushion alone upon removal of the bag, which may be desired in some situations).

In another embodiment of the invention, the die impressions and/or the preferably vertical side edge sealing means are mounted on the one or more moving means (e.g., conveyor or track systems) used to move the cushions through the bag cushion forming system. In a preferred embodiment, the moving means works in conjunction with or represents a common component with respect to the confining means so as to provide a moving and confining means. By having the vertical side edge sealing means move with, for example, a conveyor system as the moving and confining means, there is avoided a need for stopping conveyor motion to form a side edge seal, although stoppage might be required for providing a sufficient dwell time at a station to ensure the exiting cushion has sufficiently set.

Also, in another embodiment, the die impressions move together with the conveyor such as by way of direct attachment to an endless conveyor sheet. This avoids the requirement for extraction and repositioning of die impressions during bag cushion indexing in the conveyor system. The die impressions are preferably releasably mounted and/or formed of a material that will accommodate the conveyor curvature (e.g., a hinged or ball and socket mounting or a flexible material die impression).

Thus, under the system of the present invention, there is provided an automatic manufacturing process for the manufacture of foam cushions, either flat or shaped to fit or conform to the object to be packaged. The actual throughput of the system will depend on the length of the cushions, the length of the conveyor, and the cure time of the foam and these factors will determine the number of curing stations (e.g., three stations that produce a cushion about every 20 seconds, five stations that produce a cushion about every 12 seconds, etc).

BRIEF DESCRIPTION OF THE DRAWINGS

The advantageous aspects of the present invention will be more fully appreciated from the following description, particularly when consideration is given in conjunction with the attached drawings, wherein:

FIG. 13 shows a perspective view of a foam cushion bag with molded impression formed by the system of FIG. 8;

FIG. 15 shows a rear elevational view of a third embodiment of the present invention;

FIG. 16 shows a cut-away, top plan view of the right end of the conveyor shown in FIG. 15 with the conveyor having shifted to bring the die impression to the central axis of the conveyor system;

FIG. 17 shows a cut away view of a modified vent forming system for use in the present invention;

FIG. 18 shows a cut away cross-sectional view of a section of the conveyor system shown in FIG. 15;

FIG. 18A shows a cross-sectional view of ball and socket conveyor mounted die impression;

FIG. 19 shows a cross-sectional view similar to FIG. 18 except for an alternate die impression embodiment which includes recesses for forming protrusions in the cushion bag rather than depressions;

FIG. 20 shows a foam cushion with protrusions produced by the die impression device of FIG. 19;

FIG. 21 shows a cut-away view of a conveyor section having individual panels of different thicknesses and different die impressions (recesses and protrusions) for forming a series of different configured cushions for use, for instance, in a series of single package sequences.

FIG. 27 provides a schematic view of another bag cushion forming system embodiment of the present invention featuring a dual bead, parallel spaced side edge seal and an internal channel vent arrangement; and FIG. 28 provides a cut-away, schematic view of a portion of the system in FIG. 27 with an added depiction of the foaming foam material.

DETAILED DESCRIPTION OF THE PREFERRED EMBODIMENTS

Figure 1:
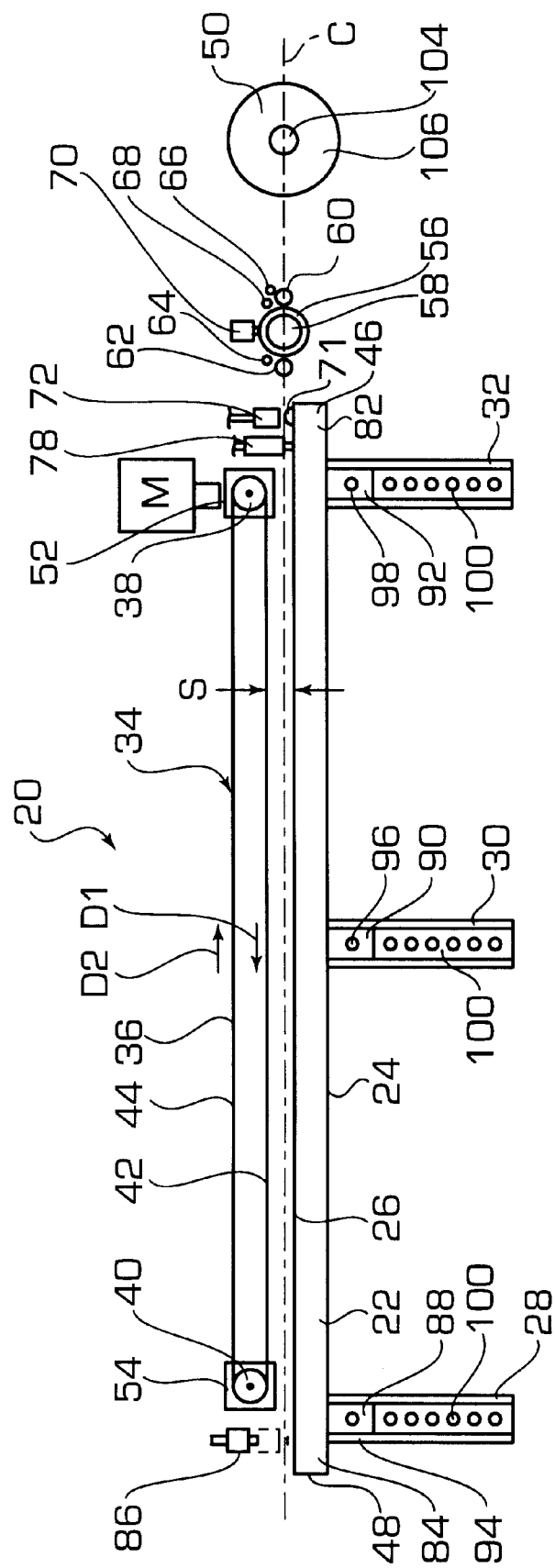
FIG. 1 shows a top plan view of a first embodiment of an automatic foam bag cushion forming system of the present invention.

FIGS. 1–8 illustrate a first embodiment of foam bag cushion forming system 20 of the present invention. FIG. 1 provides a top plan view of foam bag cushion forming system 20 in an unloaded state or in a non-processing state. As shown in FIG. 1, system 20 features backboard 22 having a first planar, preferably smooth, rectangular face 24 (designated the front face for reference purposes) and a second face (the rear face) 26. Backboard 22 is preferably vertically oriented as represented in FIGS. 1–8 (so as to take advantage of gravity during fill material insertion as explained in greater detail below), although other orientations are possible. Extending under and out away from front face 24 are a plurality of adjustment/guiding tracks 28, 30 and 32 spaced apart along the length of the front face in a first end, intermediate and second end relationship.

System 20 further includes conveyor system 34 having belt 36 tensioned between driving roller 38 and idler roller 40 so as to have front belt section 42 and rear belt section 44 of belt 36 each arranged parallel to backboard 22, running between the ends of backboard 22, and preferably also generally equally spaced inward from ends 46 and 48 of backboard 22. Depending on the desired length of conveyor system 34 additional driving and or idler rollers can be positioned in spaced fashion between the end rollers 38,40 and/or a backing, slide wall structure can be positioned behind the front belt section 42. Rollers 38 and 40 are vertically oriented and extend upwardly from bases 52,54, respectively. The vertically oriented belt sections 42,44 are shown by drive arrows D1 and D2 to be rotating clockwise with respect to rear face 26 of backboard 22 such that drive arrow D1 moves away from end 46 which is the end positioned closest to film feed support 50 (described in greater detail below). Under this arrangement, belt section 42 is positioned a distance S away from rear surface 26 of backboard 22. Conveyor system 34 further includes motor M which is in driving communication with drive roller 38. Rather than the backboard/single conveyor relationship shown in FIG. 1 other moving and foam expansion limiting or confinement means can be relied upon such as two spaced apart conveyors, preferably similar in design to each other and with one or both adjustable for modifying spacing S.

Between film feed support 50 and end 46 of backboard 22, and lying along central axis C, there is positioned dispenser assembly 56 which in a preferred embodiment is a dispensing system of the type described in PCT application PCT/US98/06508, filed on Jan. 4, 1998, which is incorporated herein by reference in its entirety. Dispensing assembly 56 preferably includes dispenser 58 having an internal, reciprocating mixing chamber receiving precursor chemicals A and B from respective feed lines 60 and 62 which, when mixed, form a foam material. The formed foam material is preferably a polymer foam material such as a polyurethane foamed material as described in PCT/US98/06508 although other settable or curable foam materials can be used in the present system as well as non-settable but conforming and cushioning packing material (foam or non-foam) which can be fed in through the use of other, dispensing or feeding means. As will become clearer below, however, the present invention provides a system that is particularly well suited for use with foam material that expands following introduction into a reception area or container and which goes from an initial cream state upon introduction into a substantially set final form in a relatively short time (e.g., 1 minute), as the arrangement of the present invention is particularly well suited for the maintenance of shape control in the container receiving the cushion packing material.

The dispensing system 56 shown in FIG. 1 is dimensioned and arranged to feed its output into film material which is in the initial stages of bag formation as described below. In utilizing the dispenser described in PCT/US98/06508, dispenser 56 features solvent flush feed line 64 that provides a continuous source of solvent material for the solvent flushing passageways in the dispenser that prevent undesirable dispenser system lock up. Lines 66 and 68 are air pressure lines that are used in the reciprocation of components within dispenser 58 to switch between output and non-output dispenser states. Support 70 is used to position and hold dispenser 70 in the desired position. Support 70 is shown to be a rigid bar attached at one end to the dispenser's main body and at an opposite end to stationary member 71. Stationary member 71 can be a portion of an encompassing system enclosure (e.g., the enclosure of FIG. 22 described below) or an overhead fixed structure extending d own from a ceiling or an overhead track unit if dispenser adjustment along an axis parallel to center line C is desired. Various other support arrangements can also be utilized such as a pivoting support at the upper end for clearance access and/or a pivoting relationship between dispenser 56 and the lower end of support 70 for providing an output angle adjustment feature such as within a vertical plane along center line C, or a flexible support conduit that allows for essentially complete freedom of manipulation.

Figure 2:
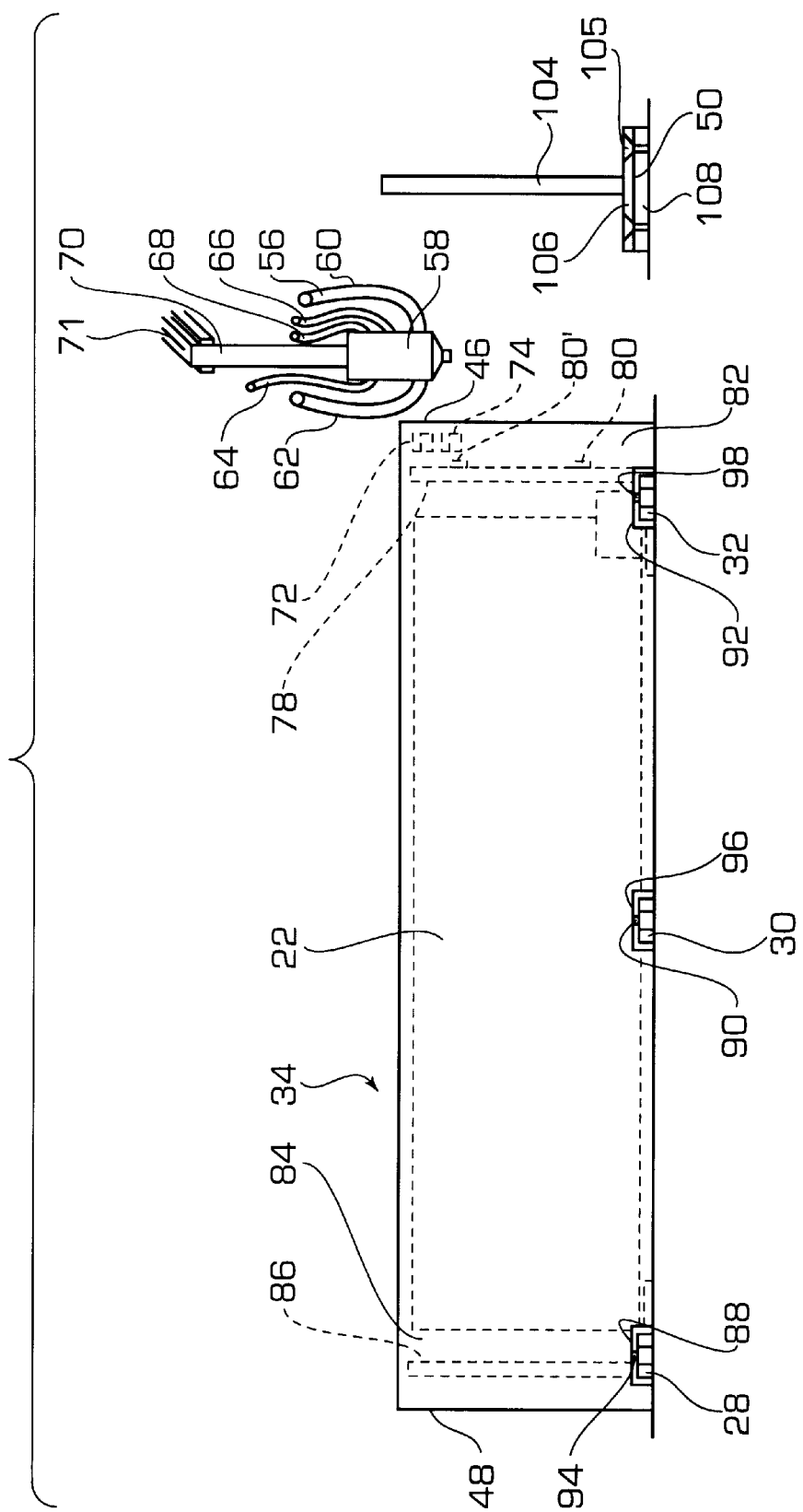
FIG. 2 shows a front elevational view of the non-conveyor or backboard side of the system shown in FIG. 1.
Figure 3:
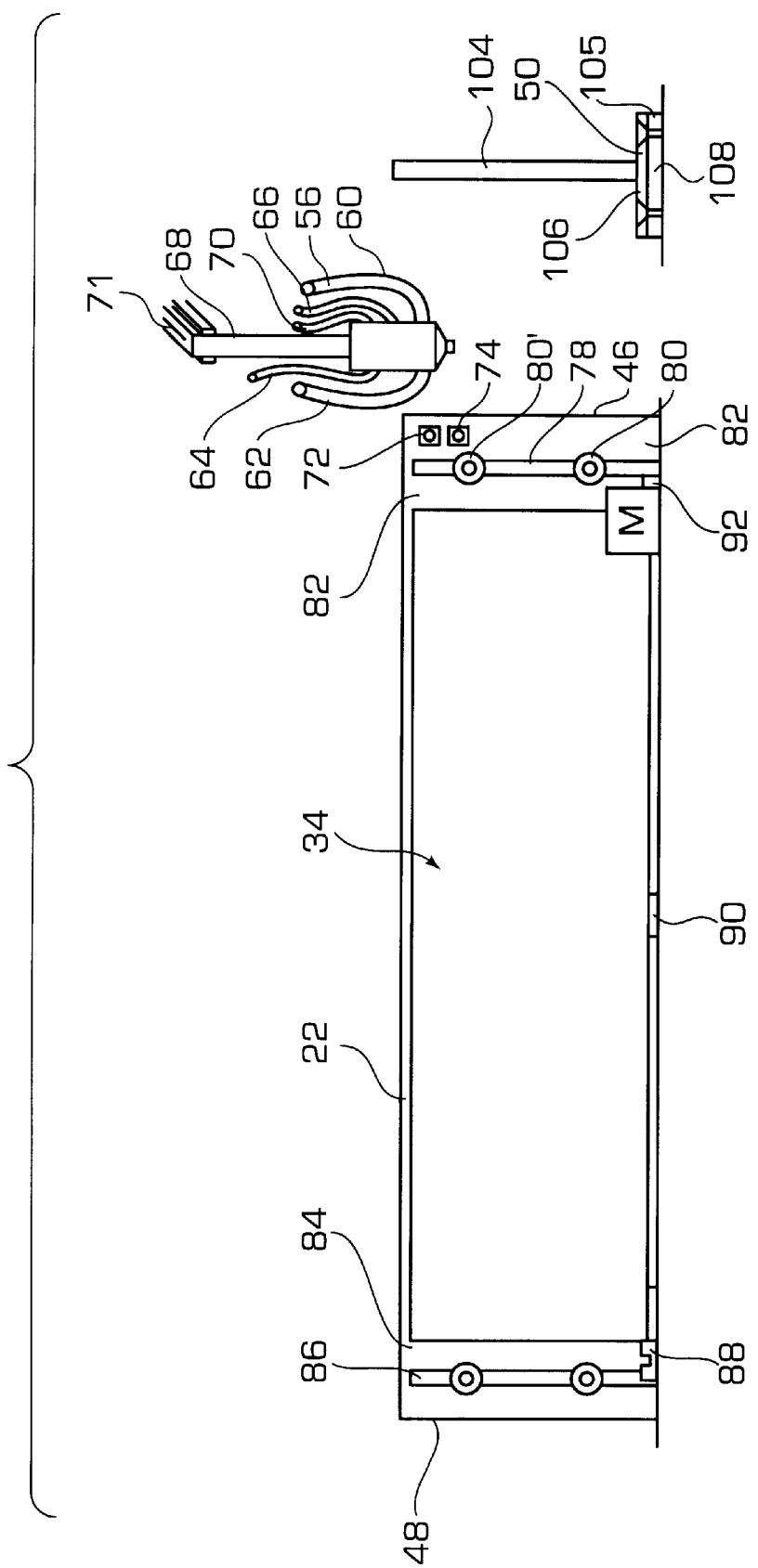
FIG. 3 shows a rear elevational view of the conveyor side of the system in FIG. 1.
Figure 4:
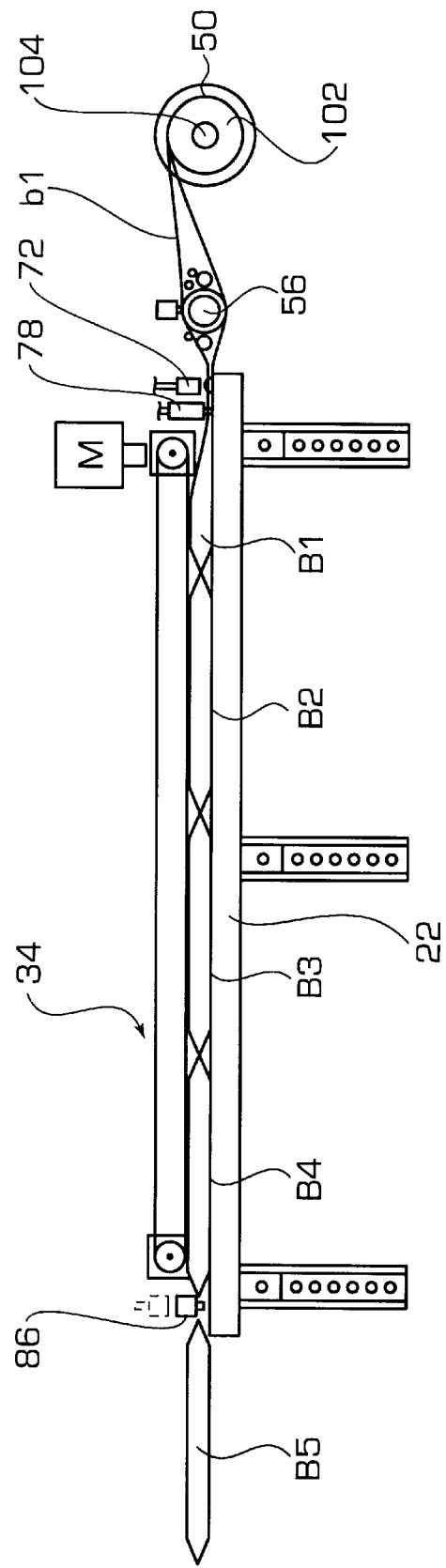
FIG. 4 shows a top plan view similar to FIG. 1 except for an illustration of the film feed and cushion forming features of the present invention.

With reference to FIGS. 1–3, system 20 further comprises upper edge seal forming device 72 which, in a preferred embodiment, is an insert with a cartridge type heating unit like that described in U.S. patent application Ser. No. 09/076,087, and as described below with respect to the FIG. 26 description. Edge sealing device 72 is positioned so as to contact an upper edge area of the bag film material fed past the dispenser. Sealing device 72 is supported so as to maintain a constant contact relationship with respect to the film material being fed toward the conveyor system as illustrated in FIG. 4 and described in greater detail below. As in the above described U.S. '087 application, upper edge seal forming device 72 is preferably resiliently biased (e.g., an integral flexing holder) so as to maintain a pressure relationship with respect to the passing film. Upper edge seal forming device 72 extends out toward compression slide pad 71 such that, during film feeding, upper edge seal forming device 72 remains in biased, constant contact with the film material being compressed against the pad as it moves through the system. Pad 71 thus functions as a compressible film backing means and can assume a variety of forms such as a rectangular pad or roller supported directly by the backboard or some other structure which places it between the backboard and film material being fed through the system.

When the upper edge sealer utilizes a heating unit (e.g., a small section of exposed wire either fed through a slot in the upper edge sealing unit's main body or a heat cartridge with exposed metal heat element), the continuous, biased contact helps in providing a self cleaning function as any melted plastic film material that might otherwise stick and build up on the heating element is wiped away automatically by the moving film material being fed into position with respect to the heating element. By controlling the amount of energy provided to the resistant heating element in relation to the degree of compression contact on the film a good seal can be provided without a burn through of, for example, the more susceptible closest film side of a "to-be-formed" foam cushion bag.

Positioned below upper edge seal forming device 72 is vent forming device 74 (FIG. 2) which is illustrated as an insert with a cartridge heat unit that is run at a higher temperature than edge seal forming device 72 and is turned on for a short period to form a vent 76 (FIG. 5) in the bag being formed. With the above/below insert arrangement, a continuous upper edge seal is provided and the vent is formed in a desired area along the upper edge area of the bag, below the upper edge seal forming device 72, and somewhat laterally out (e.g., in a non-product contact direction) from the centralized upper edge following foam expansion.

As shown in FIGS. 1–3, there is also provided elongated side edge sealer 78 which extends transversely to the direction of conveyor movement D1 and thus vertically in the illustrated embodiment. Side edge sealer 78 is positioned adjacent to and in an opposing relationship with the free end section 82 of backboard 22 extending away from the corresponding end of the conveyor to backboard end 46, although a stand alone arrangement with self provided backing member represents another embodiment. Sealer 78 is of a sufficient length or operates to achieve a sufficient length to seal off the entire vertical height of a bag being formed from the film material being supplied. Side edge sealer 78 is provided with advancement/retraction means which in a preferred embodiment is a single or multiple number of solenoids or air driven hydraulic activators to shift sealer 78 from a retracted position to a compression position with respect to both a backing member such as the backboard and the film being passed therealong. Depending upon the relative extension and spacing adjustment ranges a suitable elongated compression pad structure can be provided either directly supported on the backboard or self supporting (e.g., see the example in FIG. 22). In FIGS. 1–3, a pair of solenoids 80,80' spaced along the length of vertical sealer 78 is illustrated as one possible advancement/retraction means.

While sealer 78 is shown in FIG. 1 positioned on the downstream side of both upper edge sealer 72 and vent former 74, as will be seen in the discussion to follow, various other arrangements are also possible including a positioning of one or both of members 72 and 74 to the opposite side of vertical edge sealer 78. Vertical edge sealer 78 can take a variety of forms including one or more hot wire or ribbon extensions with temperature control supported on a vertical support bar with some degree of spring bias which, upon compressing film material against the backboard or other compression absorption means, acts to merge or bond two film sheets together. For example, removed components of a commercial thermal impulse heat sealer mechanism, such as one made available from the Vertrod Corp. of Utica, N.Y., and commonly found in use in food packaging, can be used as components in a new edge sealer combination built to suit the intended use environment of the present invention. In addition to forming the edge sealer with one or more vertically extending hot wires to seal (but not cut through) compressed film material, a perforating serrated strip or other break away facilitating means can be used in conjunction with the vertical edge sealer (e.g., a pair of parallel heat seal wires and a serration edge or third heat cutting wire therebetween). In one embodiment of the invention, a pair of vertically extending, spaced apart (e.g., <2 inches) heat elements are arranged on a reciprocating common frame support so as to form two parallel seal beads with a dividing film section therebetween forming a bag chain link. Backboard 22, along which the bag chain slides, is preferably formed of a durable, low friction material such as an aluminum channel or a combination of materials such as a vinyl or linoleum laminate covering a wood base (with or without special pads of heat dissipation or serration strip absorbing material in areas corresponding to the edge sealer mechanisms). Also, vertical edge sealer 78 can be supported by the aforementioned enclosure or by an independent vertical support stand. Furthermore, as another example of a vent former, a heat insert or mechanical film cutter can be positioned on the reciprocating side edge sealer or on its stationary backing member and is preferably spaced within one inch and to one side of a vertical seal element of sealer 78.

At the opposite end of backboard 22 there is positioned second free end section 84 of backboard 22 between conveyor roller 40 and backboard end 48. Adjacent end section 84 there is provided cutting means 86 which preferably has a structure similar to that of vertical edge sealer 78 at least from the standpoint of having advancement/ retraction means and preferably at least one hot-wire extension that is operated at temperatures suited for cutting plastic film as opposed to merely bonding two stacked sheets into one in the area of contact. With the formation of perforations reliance on cutting means may be avoided. Alternatively, in some embodiments of the invention, such as the below described systems having a conveyed impression die arrangement or upstream film drawing system, both sealing and cutting can take place at the front end of the conveyor and non-linked bags can be conveyed through the system. Depending on the heat seal formed by member 78 it may also be possible to maintain the chain of bag cushions and have an operator or automated pulling means pull apart the individual bags upon exiting the system. The use of cutter 86 provides, however, added assurance of a clean and fast separation as it operates with high cutting efficiency and without a pulling effect on any other attached bags, and the use of the aforementioned spaced apart vertical side edge sealing beads formed for example by a pair of heat seal ribbons (e.g., 1/16th inch thickness) provides for some degree of tolerance with respect to minor shifting in the conveyed bags at the time of bag separation. As with the heated edge sealer, the backboard across from the cutter can be provided with heat dissipation pads such as silicone rubber pads or can be formed entirely of a suitable material for handling the heat generated or with a complete surface laminate of suitable heat dissipation material.

One or both of backboard 22 and conveyor system 34 is adjustable to provide for a variety of different length spacings "S" between the two for controlling the thickness of the bag cushion being formed as made clearer below. Spacing S can be formed of any length which, with respect to at least the upstream end of the conveyor system, provides for proper cushion material compression and set up with respect to the intended use of the product and within the desired time period the bags will be between the two. The minimum spacing for "S" is governed by the fact that if the spacing is too small than the resultant cushion bag formed will not have a sufficient degree of compression absorption to make it practical. In a preferred embodiment of the invention, there is provided adjustment control for providing a range of "S" from ¼ inch to 1–2 ft. at small increments (1/16 to ¼ inch increments). In a preferred embodiment, backboard 22 is adjustable toward and away from a fixed conveyor system 34 with such adjustment being either automated or conducted manually. FIGS. 1–3 illustrate a manual adjustment assembly wherein backboard 22 has track extension members 88, 90, 92 that are received within respective track slots formed in guiding tracks 28, 30, 32. Each of track extension members 88, 90, 92 has a retractable, spring biased male member (94, 96 and 98) which can be inserted into and removed from one of openings 100 formed in a series in each track. Suitable wheeled supports provided along the backboard can also be relied upon. Alternatively, an automated space adjustment system can be provided through use of stepper motors or two or more telescoping members spaced apart on the backboard or a motorized track adjustment system, etc.

Figure 5:
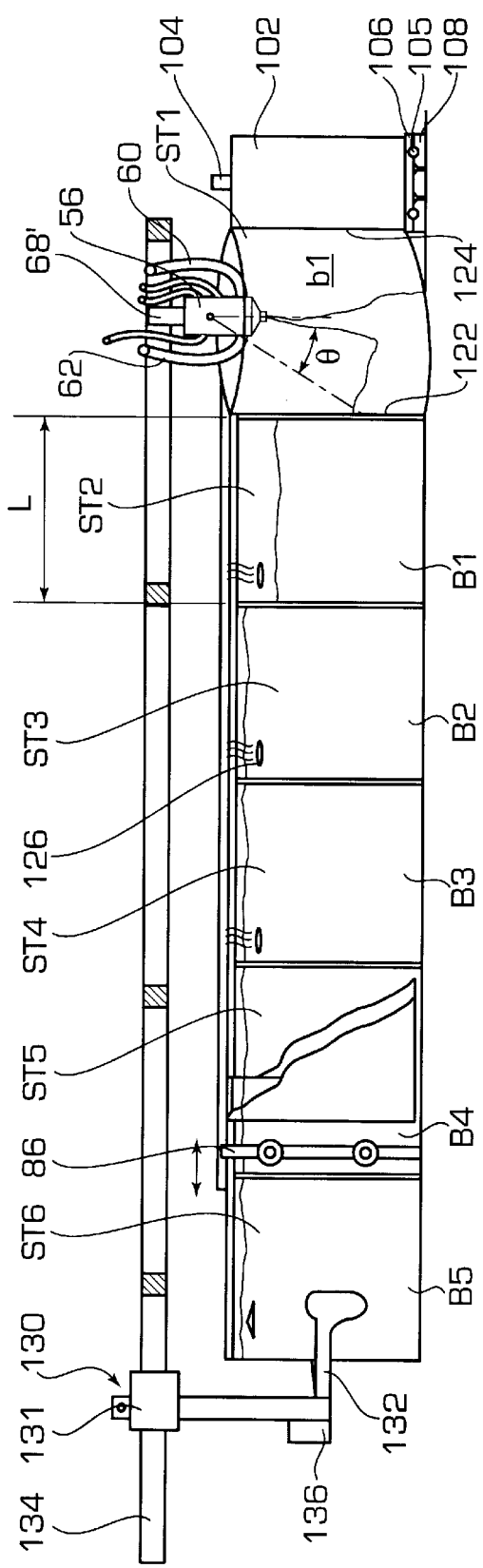
FIG. 5 shows a rear elevational view similar to FIG. 3 except for a cut away of the conveyor system to better illustrate the cushion bag formation and an added upper support assembly and bag delivery and separation system.
Figure 6:
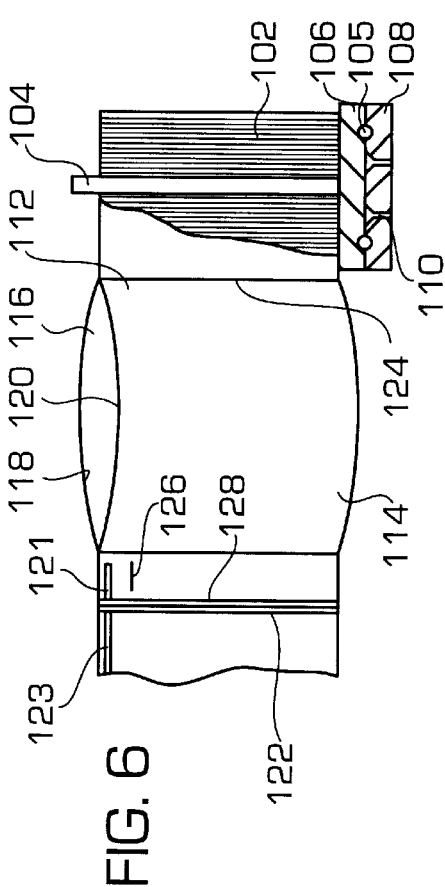
FIG. 6 shows a perspective view of the preferred C-fold film being fed from a supply roll and the status of that film when passing past a dispenser and the subsequent initial bag formation.

With reference to FIGS. 4–7 the bag forming and filling process is explained in greater detail with the system shown in FIG. 4 being the same as that of FIG. 1 except for the illustration of the film material feeding and bag cushion formation. As shown by the top plan view of FIG. 4, there is preferably provided a single source of bag film material which is a single roll of "C-fold" film material 102 with a central passageway through which extends post 104. "C-fold" film material 102 is formed by folding an elongated sheet along an intermediate point of its width such that there is provided two, coinciding preferably free edges spaced from an uninterrupted edge represented by the fold line. A suitable film material is one formed of HDPE which is relatively thin, but of sufficient tension strength (e.g., 0.00075 of an inch). The film is purchased by the roll and, with respect to a preferred embodiment of the present invention, the length of the purchased roll coincides with the maximum height of the bag to be produced (the upper edge sealer preferably being adjustable to handle lower bag height settings). The roll of film is mounted on a rotating feed out support such as that represented by film feed support 50 which includes post 104 secured or made integral with top plate 106 of film feed support 50. Top plate 106 is supported on bearings 105 provided on the upper surface of lower plate 108 which is secured to an underlying support such as the floor by way of recessed bolts 110 (FIG. 6). Thus, a "lazy susan" like arrangement is provided which allows film roll 102 to freely play out the "C-fold" film material.

FIGS. 4 and 6 illustrate section 112 of the C-fold film material which is a section that has been fed out from roll 102 but is a section that has not yet had an upper edge seal formed therein or a vertical side edge seal formed therein. The C-fold film material features central, bottom crease edge 114 and an upper edge section 116 comprised of two at least initially contacting but unconnected upper film edges 118, 120. Thus, in section 112 the unconnected upper film edges 118, 120 can be temporarily separated so as to pass to opposite sides of dispenser 56. Preferably, the output end of dispenser 56 is at a level that is just below the upper level of the free edges (e.g., within 6 inches), although an opening guide or guides can also be relied upon with a dispenser output provided either below or above the opened edges 118, 120. As shown by FIG. 5, the foam input is initiated when the bag is not yet entirely formed in that there is provided only one downstream, vertical side edge 122, the already formed C-fold film bottom edge 114, and a partial upper edge seal segment 121 to which the upper edge sealer has come into contact (or the upper edge sealer can be placed to the opposite side of the vertical side edge sealer wherein 121 would not be present). Despite, a bag not yet having been completed in what will be referenced as station 1 for convenience, the creamy foam material exiting the dispenser is trapped within the partially completed bag due to its not yet risen state with respect to the upper edge and the fact that the C-fold film has its side sections in tensioned contact coming off the roller. To further facilitate the keeping of foam away from exit edge 124 of film roll 102 and the initiation of foam material supply close to the upstream seal, the output end of dispenser 56 can be rotated in the direction of conveyor movement by tilting the outlet within the range designated by Θ (e.g., within 45 degrees away from vertical 0) or, for the altered support assembly 68' in FIG. 5, a shifting of dispenser 56 along the longitudinal support beam 126 can also be used instead or in conjunction with an other than vertically oriented dispenser. As noted above, in one embodiment of the invention a portion of the upper edge seal is formed (e.g., <33% such as 25%) by the time of initial foam output, although formation of the upper edge seal can be initiated downstream of the side edge sealer with a sufficiently close enough positioned upper edge sealer and/or a fast enough foam dispensing system and conveyor speed and/or a slow initial rise material. Also, it is preferable to have a system that can quickly pass the not yet completely formed bag with creamy foam material content into position before the accelerated or rapid rise of foam begins (e.g., less that 10% foam rise before the bag is fully between the conveyor limiting means).

The speed of feed out of the film (based on the conveyor's pull alone and/or an upstream film controller) is dependent upon such factors as the time required for the foam material to sufficiently set so as to retain its shape before exiting the restraints imposed by the conveyor system and the length of the conveyor. In situations where the conveyor is of a proper length and the foam material sufficiently quick enough in curing before the first in bag reaches the end of the conveyor, the conveyor can be run continuously except for a brief stop for the activation of the side edge sealer and, if present, the simultaneous operation of a downstream cutter. For embodiments like those described below wherein the side edge sealer operates on the fly together with the conveyor(s) movement and where the conveyor is sufficiently long enough and the curing time fast enough, a continuous running conveyor system can be provided for forming a series of completely set foam bags at the exit, as no side edge sealer stoppage is required and the separation of bags, if linked at the time of output, can be handled downstream from the conveyor system. Continuous conveyor operation can be either done at a constant speed or at varied speed to help coordinate the release of the first bag in the system after sufficient curing time.

For those situation where the foam material is not sufficiently fast curing or the conveyor length is not sufficiently long enough, a brief dwell time can be provided that is either represented by the time for forming the side edge seal (for those embodiments not operating with an on the fly side edge seal system) or that amount of time plus an additional delay period. The sum of these dwell periods is designed to coincide with the time it takes to have the foam cushion retain the imposed shape such that upon the next indexing of film material and downstream bags, the first to be formed bag in the system exits the system simultaneously with the introduction of the new film length to be formed into a bag. The indexing operation involves the running of conveyor system for a sufficient amount time to have the second formed vertical edge seal formed at the desired length of the bag's side edges which is represented by "L" in FIG. 5. The second formed vertical side edge seal for a just completed bag also represents the first side edge seal of the upstream to-be-completed bag receiving foam material through its upper end.

The value of "L" can be maintained constant for a repeating series of bags whereupon following the end of one series (with a break in time or on a continuous basis) the length "L" can be altered in accordance with suitable control parameters of conveyor system 34 to allow for a subsequent set of bag widths "L". Alternatively, a sequence of different lengths "L" can be generated one after another. Thus, by properly controlling the length "L" for a series of bags, the bag lengths can be made to conform to a particular packing sequence (e.g., a packing facilitating sequence of a first size for insertion in the bottom of a box, a second size for a box's long side wall insertion, a third size for a box's short side wall insertion, a repeat of the second and third size and then a repeat of the first size for the top of the box). While the present invention is capable of producing essentially any length "L" (with perhaps the conveyor length being one possible limiting factor depending on curing speed), a range of 4–60 inches is representative of a useful range with 8–36 inches being particularly well suited for many uses.

The height of the roll film material used to make the cushion bags is preferably in the range of 6 to 36 inches and the conveyor is preferably sized to have a corresponding height (e.g., within +/−1 inch) to the maximum height of film to be handled by the system. Through the use of a vertically adjustable upper edge sealer, the height of the bag can be varied by inserting a new size roll and adjusting the upper edge seal with respect to the new roll. In addition, vertical height adjustment can be made on the same film supply roll through a repositioning of the upper edge sealer. For example, an 8 inch high roll can be used for forming bag heights of about 8 inches as well as shorter height bags such as a 6 or 7 inch height bag or even less by an adjustment in the upper edge sealer's positioning height. Any excess film material can either be cut off with a cutter or retained and folded out of the way during use.

Preferably, the film material is in the process of being indexed while the foam material is being dispensed as, even with a high volume output dispenser such as that described in PCT/US98/06508, it is preferable to pass the dispensed foam from station ST1 to station ST2, which is the initial station between the conveyor and backboard, as soon as possible. In this way, in addition to increasing the overall speed of the system, the more malleable cream material can be easily drawn between the conveyor and backboard before expanding outward so as to be in the proper position during the initiation of the rapid rise stage of foam formation.

As also shown in FIGS. 5–8, vent former 74 operates to form vent opening 126 just below the continuous upper seal 123 of which segment 121 (FIG. 6) is a part. Although shown in FIG. 5 to be below the upper edge of the conveyor, it may in some instances have both the continuous seal 121 and vent 126 above the upper edge of the conveyor and below the upper edge of the backboard such that any released foam material from vent 126 will not be directed into direct contact with the conveyor belt. Suitable framing structure of an encasing (not shown) can be provided to direct any released foam material away from the conveyor system and into an easily cleanable section of the encasing.

As described above, when a dwell time is required, it is preferable to have an equal dwell time at each indexed station, and the longitudinal length of the backboard 22 and conveyor system with respect to the desired bag width(s) set up so as to provide continuous support contact until the foam in the bag cushion has sufficiently set up or cured as to retain its shape, despite being handled in the removal from the conveyor system or thereafter. As just one example of a process involving a dwell time that is required due to the rate of polyurethane curing and the length of the conveyor, following indexing into station ST2 of the formed bag, the bag is retained at station 2 for a 12–20 second period before being indexed to the next station, as a 12–20 second period of time is sufficient for many polyurethane foam materials to go from the cream state to a full rise (but not yet cured state). This dwell period is suitable for situations wherein it is desired to have the foam rise to close to its full expansion state at station ST2 for purposes such as imposing a die impression in the still yet-to-be cured foam material, as described in greater detail below with respect to FIG. 8. Much shorter dwell times (e.g., 3 seconds) are available under the present invention when the expansion takes place along the length of the conveyor used. While the period of time for this degree of sufficient curing varies with the materials utilized and environmental conditions, a period of more than 30 seconds to about a minute is a typical time frame for most foams.

Taking one minute as a time period wherein continuous contact is desired for a particular foam and a desired bag width of 30 inches, an example of an indexing sequence is provided with respect to FIG. 5. Prior to initiation of an indexing of the cushions, the last formed bag B1 is at station ST2 with its right most edge essentially commensurate with the right end of conveyor 34 since the edge sealer 78 is positioned within an inch of two of the extreme end of the conveyor (or die impression if supported on the conveyor as described below). When bag B4 has been in contact with the conveyor for a one minute period, an index sequence is initiated such that bag B1 is shifted from station ST2 to ST3 and a corresponding shift takes place with respect to the downstream bags such that bag B4 shifts to the position shown to be occupied by B5 in FIG. 5 whereupon vertical cutter 86 is operated to detach the ready to be removed bag B4 from the upstream bag B3. During this indexing period, the initially, not yet completed bag B1 in station ST1 (e.g., one side edge seal and all or a portion of the upper edge seal not completed) is shifted to the left and receives foam material from the dispenser as it shifts with respect to the dispenser. The dispenser dispenses for about 0.5 to 5 seconds so as to provide a sufficient volume of foam to cover most every package size used in the industry, although the present invention is flexible enough to cover a variety of atypical sizes which may involve more or less than the 0.5 to 5 second dispensing duration described above. The relatively fast dispensing stage allows for rapid indexing of the bags from one dwell location to the next. For example, by the time 30 inches of roll film length has been played out the dispenser has already completed its dispensing of a suitable volume of foam material and the left edge 122 of the not yet completed bag B1 has shifted over to the left edge location previously occupied by bag B1. Once the 30 inch shift has taken place the retracted vertical edge sealer is shifted forward to complete the bag B1 transformation into a completed bag. The upper edge sealer provides a continuous and uninterrupted upper edge seal as the C-fold film material is fed past sealer 72 while the vent former act to form a vent hole sometime during the 30 inch passage of film material there past.

Since the desired bag length is 30 inches and the total of the dwell time is about 1 minute, and the conveyor has sufficient length to accommodate the full sum of dwell times (e.g., a 10 to 12 ft. conveyor), a dwell period of 15 seconds between indexing initiations would provide sufficient contact with the conveyor to reach the desired 1 minute contact period (e.g., a 15 second dwell period comprised of a 5 second index or bag feed out period with edge sealing and a 10 second pause between completion of the bag feed out indexing and the start of the next indexing period).

FIG. 5 schematically illustrates the various stages the foam assumes both from the standpoint of rising in a formed bag and setting up or curing during the dwell period. As noted above, the station ST2 is the station where preferably the all or essentially all creamy foam material is first received between the space defining means of the conveyor system and where, in certain applications, it is allowed to rapidly rise to assume its final rise state or close to its final rise (80% or more). Although less than 80% rise level may be preferable in other applications such as when the set up time is short and a more continuous passing of the bags is possible. During this rise, the reaction gases exhaust out of the bag via vent hole 126 (or a plurality of vent holes either along a common line or at a variety of positions such as to opposite sides of the bag). The foam in the bag is shown in stations ST3–ST5 to be undergoing the change in state involved in a curing process wherein at the end of the dwell period at station ST5, the bag is shifted in the next indexing to the ST6 station whereupon it is separated by operating cutter 86 for removal by an operator or an automated device. Alternatively, a separate cutter can be dispensed with if serrations 128 (FIG. 6) are formed on the bags at the time of edge sealing wherein an operator or an automated device separates the bag along the serrations or in situations where the operator or automated device rips the bag along a non-serrated heat bond strip at a later time.

As an additional example of a foam bag cushion forming process, a 12 ft. conveyor is provided having a single speed rate of 12 inches/second with the foam bag forming system including a vertical sealer designed to form a seal in about a 3 second interval and a dispenser outputting a polyurethane foam having about a 40 second sufficient cure time period. The desired length of the bags is about 36 inches. At 12 inches/second, it takes about 3 seconds for the system to index the upstream film material and downstream bags the 36 inch length of the bags. A pause time of about 7 seconds following the 3 second index is thus involved with 3 seconds of the pause time being the time involved in forming a vertical seal to complete a downstream bag. Thus, following each dwell period (time from initiating index to end of pause period), a completed foam cushion can be ejected at a rate of 6/minute with the 12 ft. conveyor.

With the extension of the conveyor or a decrease in bag length, even a greater bag output per minute is made possible. For example, if a 21 ft. conveyor were utilized (the next standard off the shelf size for conveyors) then there would not need to be the 7 second dwell time period required to ensure sufficient set up prior to each bag being released from the system. Since a 21 ft. conveyor length would avoid the pause time associated with a 12 ft. conveyor, the main controlling factors would be the 3 second indexing period to feed out a 36 inch length of film before each seal formation and a 2 to 3 second vertical seal formation period (making for a dwell period of about 6 seconds). With a dwell period of 6 seconds involved in shifting a bag to a new station and pausing until the side edge seal is completed, and the 21 ft. conveyor providing 7 stations for the 36 inch length bags for about a total curing of 42 seconds (actually a bit more when considering the initiation of the rising and curing process occurring downstream of the dispenser's mixing of the chemicals and upstream of the confinement means), an output of 10 bags/minute is made possible. That is, a bag can be exited every 6 seconds since the conveyor is long enough not to add any additional dwell period to that 6 second period involved with indexing and sealing. From the foregoing, it can also be seen that if the vertical side edge sealer is allowed to operate "on the fly", as described below with relation to the FIG. 15 embodiment, only the conveyor indexing speed would be of chief concern since the 2 or 3 second stopping period for forming the seal would not be required. The range of conveyance speed (e.g., 6 inches/second to 24 inches/second) can be coordinated with the conveyor length (e.g., 6 to 80 ft. in length) to output a completed and sufficiently cured foam bag at the best possible time. For example, with a continuously run conveyor at a speed of 2 ft./second (24 inches/second) and a required curing period of 40 seconds, an 80 ft. conveyor would provide for sufficient curing time at the point of bag ejection from the system (actually more likely somewhere between 75 and 80 ft. when factoring in the time period to pass the bag from the upstream dispenser into the confinement means and any internal dispenser mixing that may be involved).

FIG. 5 illustrates an automated removal and dispersing system 130, which preferably features a slight compression grasper 132 with control 136 positioned at the end of the conveyor line, for receiving and moving to a different location completed bag B5 following operation of separator 86 (or it can shift and rotate in position to achieve a perforation separation if that is relied upon). A distribution rail system 134 with suitable switches and moving means 131 or the like, as found in some storage facilities, can be provided to include an added degree of automation for situations where a large facility for packing is involved and where different areas have different packing cushion requirements. The same rail system can also support a horizontally shiftable dispenser to allow for greater flexibility as to output location. Also, base 108 can be made adjustable to allow for a different station ST1 length.

Rather than an overhead conveyor, a horizontal floor conveyor or self propelled, preprogrammed cart can operate to distribute the formed cushions to a desired location. However, an advantage of the present invention is that the relatively lightweight and small occupation space requirements of the present invention, allows it to be positioned in a common location with the means for manufacturing products (e.g., a mezzanine above a product production facility with common or coinciding output locations). In this way, the product manufacturer can run the cushion forming system together with and at a speed that provides real time foam cushion output in synch with the product manufacturing system (e.g., two cushions per product output in a two cushion packing arrangement) and need not stock up on preformed foam cushions whether produced in house or at an outside facility and shipped in.

Figure 7:
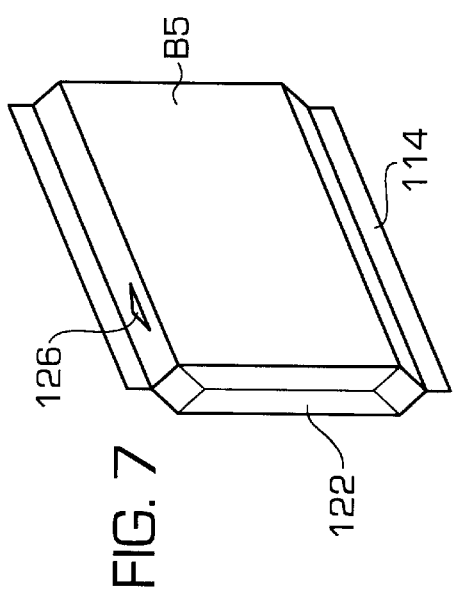
FIG. 7 shows a perspective view of one embodiment of a cushion bag formed with the system of FIG. 1.

FIG. 7 illustrates completed bag B5 which features, for example, a 30 inch width and a foam thickness of ¼ to 1 or 2 ft. thickness with a ½ inch to 1–2 inch range of thickness being common for many uses of opposed flat surface foam bag cushions like B5, particularly when package size minimization is a factor. Through use of system 20, not only is the cushion bag forming automated, but a highly consistent and accurate foam bag cushion configuration is achieved in each instance which facilitates many close fit packing processes.

Figure 8:
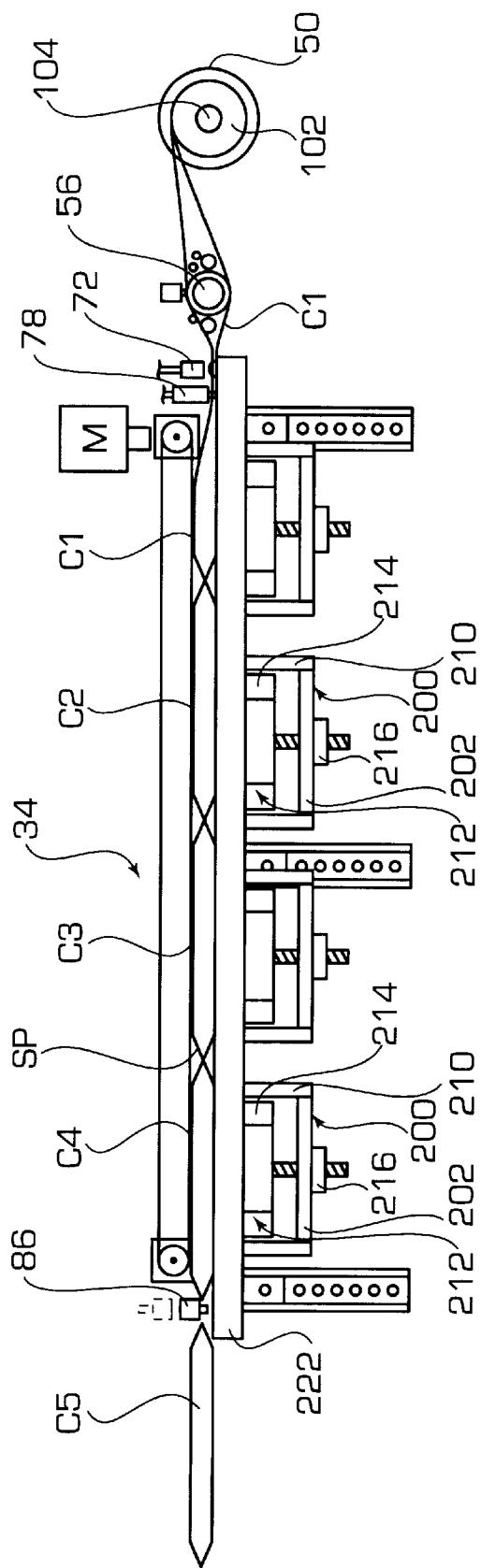
FIG. 8 shows a top plan view of a second embodiment of the present invention which shows a system similar to that shown in FIG. 4 except for the addition of an automated die impression system.

FIG. 8 illustrates a top plan view of another embodiment of the present invention which is the same as the embodiment shown in FIG. 4 except for the addition of die impression system 200. Die impression system 200 includes modified backboard 222 which supports individual die assemblies 202, 204, 206 and 208. While four separate die assemblies are illustrated, the number can be made less or more depending upon the number of separate bag cushions to be compressed between conveyor system 34 and backboard 222. As seen from FIG. 8, there is one not entirely formed bag c1 with foam material as well as four completely formed bags C1, C2, C3, C4 with foam material between the conveyor and backboard. The die assemblies are preferably centered with respect to a corresponding one of cushion bags C1–C4 although other positioning relationships may be deemed desirable depending on the desired final cushion product's dimensions. Each of die assemblies 202–208 features a support unit 210 that is attached to the front of backboard 222. Each support unit 210 supports a shifting impression die assembly 212 comprising impression die 214 which is mounted within the support unit for reciprocation within corresponding passageways formed in backboard 222. Each impression die assembly further comprises a reciprocation device 216 which, in the illustrated embodiment, features a screw thread shaft 218 extending off from each of the impression dies and received within a driving unit 220 (e.g., a motor and worm gear assembly). Various other reciprocation means are also possible such as solenoid or hydraulic reciprocation means, or a cam track and cam combination, a hand operated reciprocation means which allows for shifting and locking in two or more different positions with respect to the backboard such as a sliding key and slot or gun breech like arrangement, etc.

Figure 9:
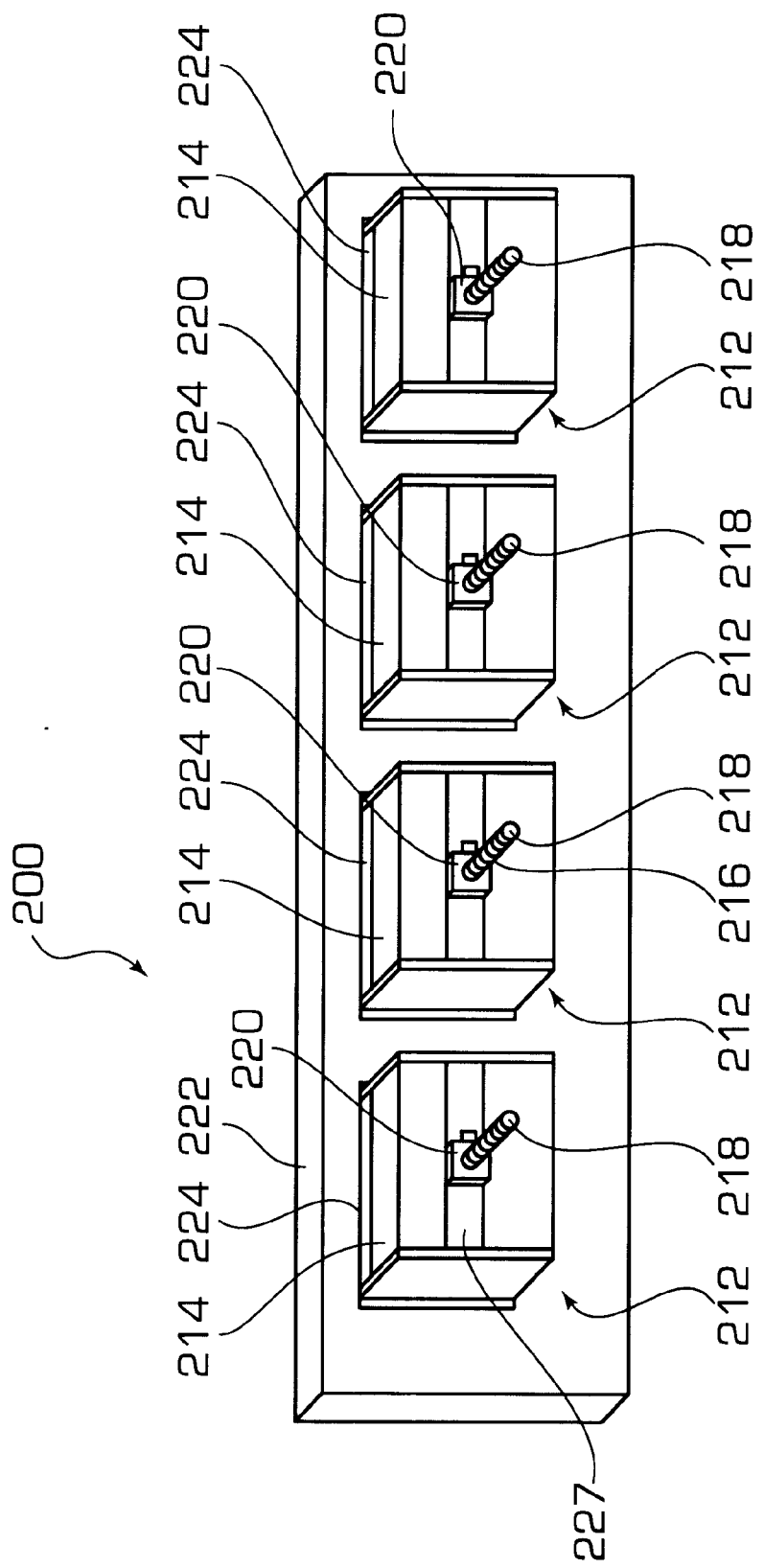
FIG. 9 shows a perspective view of the front of the backboard and the supported die impression units for use in the system of FIG. 8.
Figure 10:
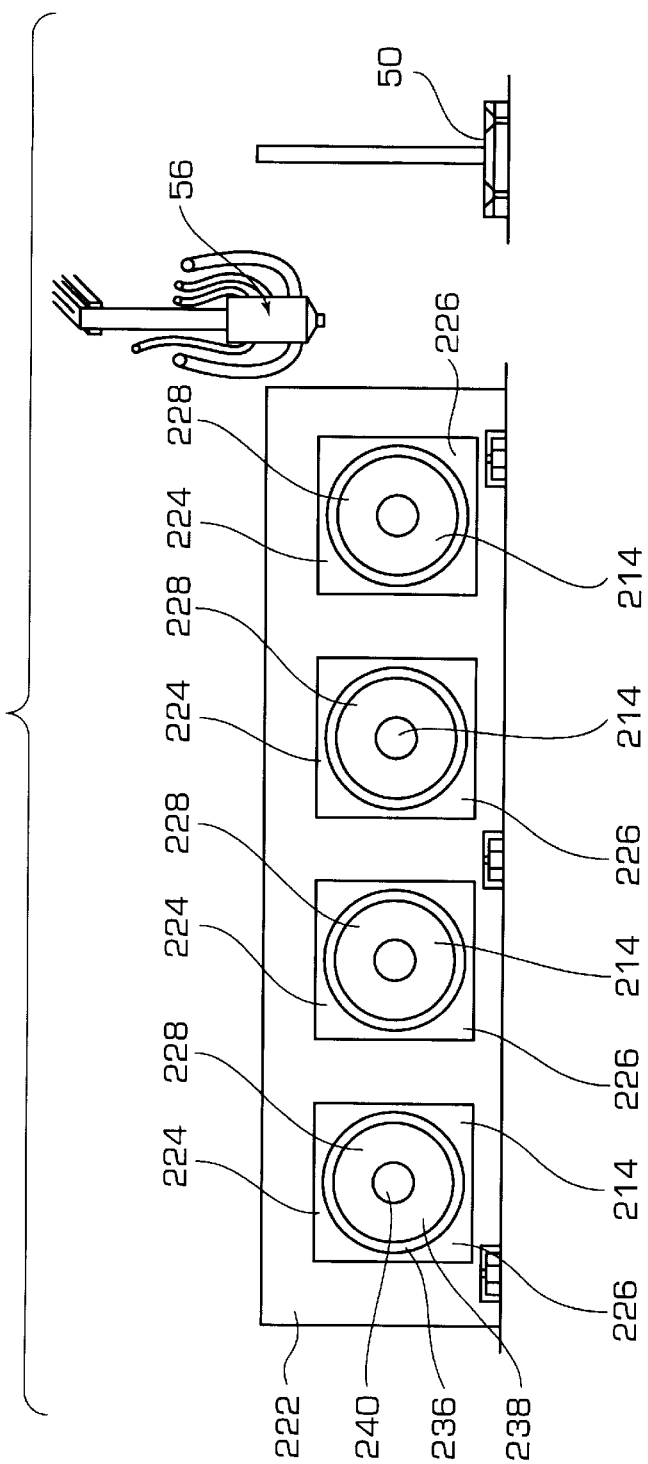
FIG. 10 shows an elevational view of the rear of the backboard in the system of FIG. 8 and the impression dies extending therefrom.

FIG. 9 shows a perspective view of backboard 222 together with die impression system 200. In FIG. 9, the impression dies are in a retracted position with respect to back bar 227 of support unit 210 such that backboard passageways 224 are partially viewable. FIG. 10 shows a rear view of backboard 222 with conveyor system 34, the cushions, and the cutting and sealing means removed for added clarity. As shown by FIG. 10, passageways 224 open out on this side and impression dies 214 each feature a sliding base 226 with an impression 228 extending toward the conveyor and into space SP defined between conveyor 34 and backboard. The degree of extension of impression dies 228 into this space would depend on the desired depth of the impression in the cushion bag. Thus, with the arrangement shown in FIG. 8, the die impressions would be in a retracted position any time the cushion bags are being indexed by the conveyor to introduce a new formed cushion and eject the oldest formed cushion, which has had sufficient time to set into its final state. Following such an index operation, and thus during the cushion bag's dwell time, the impression dies 214 are advanced so as to place impression dies 228 into contact with the opposing cushion bag. Because the impression dies are all preferably configured the same and in the same relative position with respect to the opposing cushion, the impression dies 228 act to ensure that the initial configuration set in the first bag cushion C1 is retained until the first cushion bag C1 is able to retain that shape on its own and without the assistance of an impression die.

Figure 12:
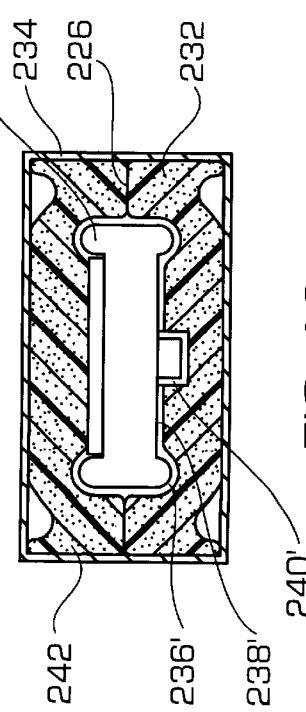
FIG. 12 shows a partially cut away view of a pair of foam bag cushions protecting a product for packaging and shipping purposes, with one of the bags being a product of the foam bag cushion forming system of FIGS. 8–11.
Figure 11:
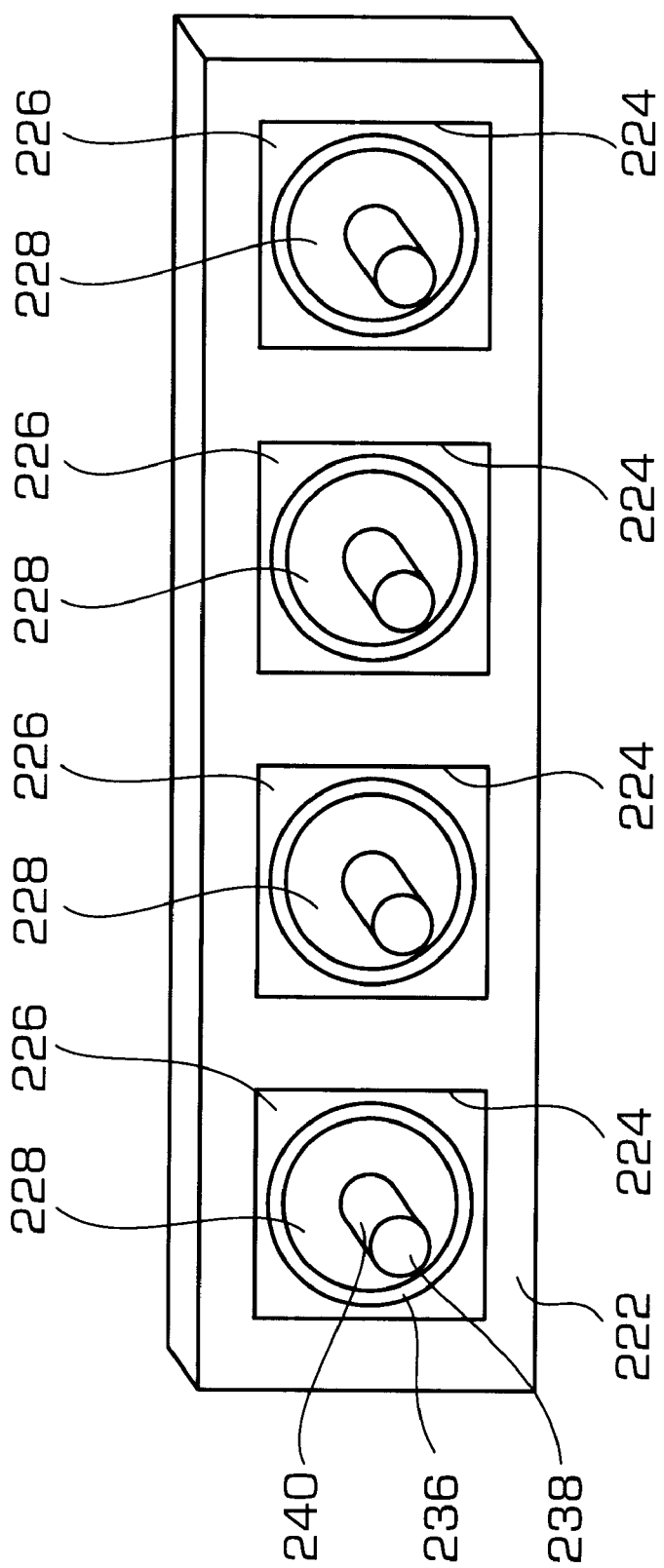
FIG. 11 shows a perspective view of the backboard shown in FIG. 10 and the impression dies extending thereoff.

FIGS. 10–13 illustrate just one of the myriad of impression shape possibilities that can be used in the present invention with the shape being any shape that allows for the aforementioned retraction and insertion when shifting between indexing and pause states. In these Figures, impression dies 228 is shaped for providing a recess for receiving a clock 230 for shipping purposes. The system in FIG. 8 is set up to form base or bottom foam cushion 232 (FIG. 12) received in container 234 (e.g., a cardboard box). The perspective view of FIG. 11 illustrates impression dies 228 having raised periphery 236, a planar annular ring 238, which is at a level more inward toward conveyor 34 than planar base surface 226, and central cylindrical projection 240 extending furthest inward. As can be seen in FIGS. 12 and 13, the die projections 236, 238 and 240 conform to the shape of the product and form corresponding product reception recesses 236', 238' and 240' in base cushion 232. FIG. 12 also illustrates top cushion 242 filling in the remainder of free space in container 234 with 226' corresponding to the planar surface of the base of die impression, which can assume a position either commensurate or internal to the plane defined by backboard 222. As the product has a different upper contact surface configuration, so too does the contact surface of top cushion 242. The top cushion 242 can be formed by a different system similar to that shown in FIG. 8 except for a different die impression or with the same system following detachment of die impression 228 (preferably in the form of a plate) from the base 226 using suitable releasable, fastening means such as Velcro patches on the base and plate, a clamping assembly, a spring biased key slot arrangement, etc. Also, while FIG. 12 shows only an above/below cushion bag arrangement, the cushions can be formed with side inserts to conform to the side surface of a product.

Figure 14:
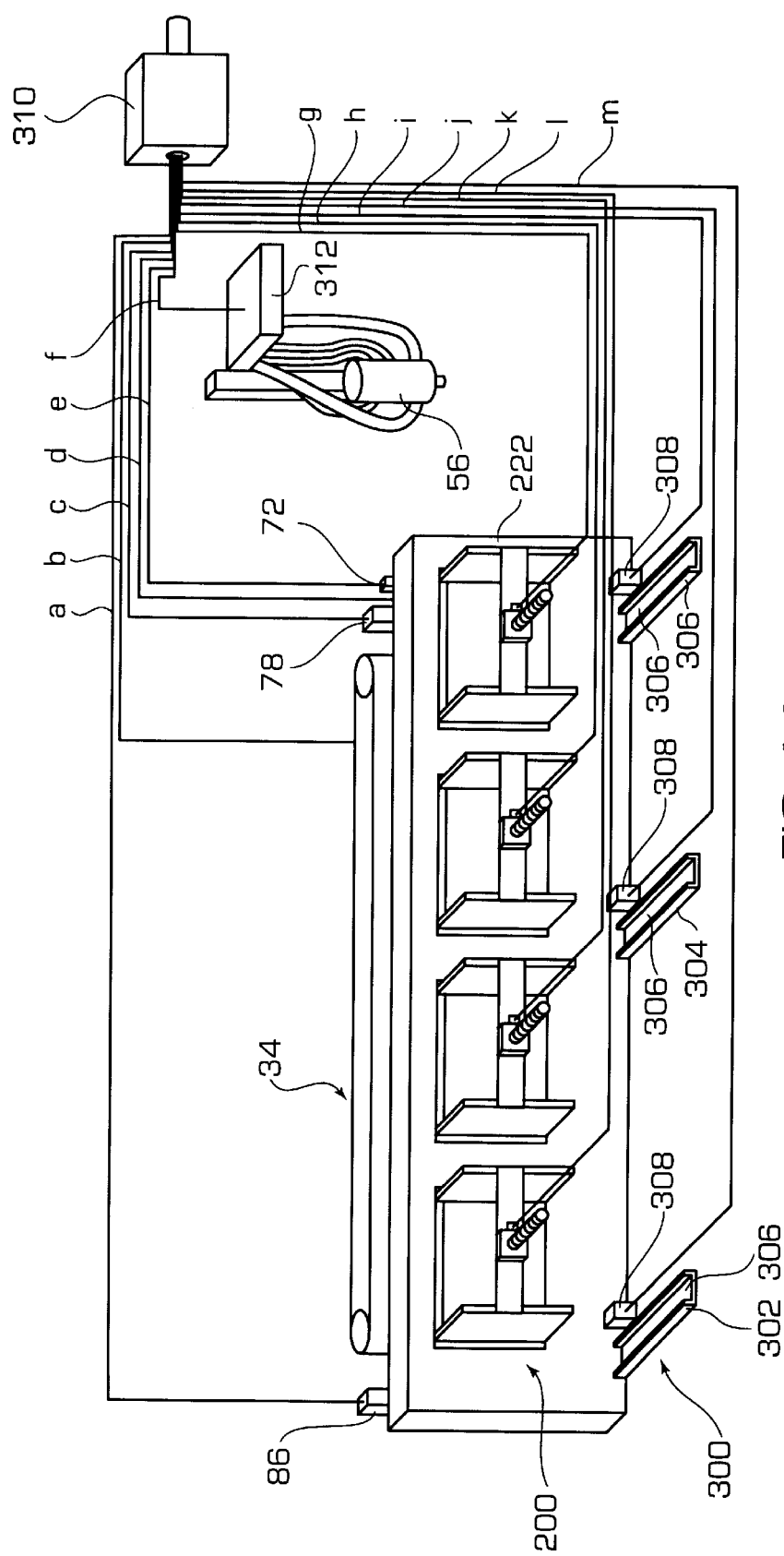
FIG. 14 shows a perspective view of the system of FIGS. 8–11 with a portion of the wiring system, an added space adjustment system, and a central control unit also illustrated.

FIG. 14 illustrates a system similar to FIG. 8 with its inclusion of a die impression system 200, backboard 222, conveyor system 34 and sealing (72, 78), venting (78) and cutting (86) means, and dispenser system 56. In addition, FIG. 14 provides a schematic view of some of the wiring and the control system useful in automation of the present invention. FIG. 14 also shows an automated backboard adjustment system 300, which in the illustrated embodiment features a plurality of tracks 302, 304, 306 with geared rack surfaces 306 which support a geared wheel of geared wheel drive assemblies 308 spaced apart along a 13 ft. long backboard being faced by the 12 ft. long conveyor in a preferred embodiment. As shown in FIG. 14, a central processing unit 310 is provided which includes an operator interface for making adjustments to the various systems. FIG. 14 also shows a valve housing unit 312 which is designed to open and close the various dispenser lines of dispenser system 56 either directly from signals from unit 310 or via a subprocessing unit provided in valve housing 312. The wiring lines or cable conduits to each of the various systems are represented by letters a–m with their final locations obvious except for wire "d" which is connected to the vent hole former cartridge not visible in the FIG. 14 depiction. With the control unit 310 controlling the pertinent characteristics such as timing, speed, position, temperature levels, and open/close state, the above described automated forming of bag cushions with or without preformed die impressions can be carried out.

FIG. 15 illustrates an additional embodiment of a foam bag forming system of the present invention which features a somewhat similar arrangement as that of FIG. 1, except that the vertical side edge sealer is attached directly to the conveyor such that it moves with the bag cushion as the bag cushion is indexed along the backboard by the conveyor. This attached vertical sealer is represented by reference number 400 in FIG. 15 and, as shown, the vertical side edge sealers are spaced apart the same width as the bag cushion to be formed (e.g., 30 inches). Suitable releasable clamps (not shown) provided at the opposite ends of the side edge sealers or some other means of fastening such as Velcro strips or conveyor sheet insertion holes or attachment members can be used to hold the side edge sealers in position with respect to the conveyor belt. Thus, the edge sealer positions can be altered to conform to the desired width of the bag to be formed with the help of indicia on the belt to designate typical bag widths. Vertical edge sealers 400 are provided or linked with a temperature control so that they can operate both as an edge sealer and as a cutter when the foam bag reaches its last position on the backboard. The side edge sealers can also be formed of a somewhat elastomeric or other soft, high friction material to facilitate positioning and traction movement of the cushion bag chain being shifted during indexing as the vertical sealing/cutting unit would stay in a continuous compression relationship with the bags at all times. The edge sealers 400 work in conjunction with the previously described upper edge sealer 72 to complete the formation of bags being passed through the system.

An advantage of placing the vertical side edge sealers on the conveyor itself is that there is no longer a need to stop the conveyor during heat seal operation as vertical edge sealing is done "on the fly" in the embodiment of FIG. 15. Thus, for those situations where the conveyor system is long enough and the curing time fast enough, the conveyor system can be run continuously during foam bag cushion production. This provides a much more efficient system as it avoids unnecessary delays. Also, with a continuously running conveyor system, the foam dispenser system can also be run in a sequence fashion corresponding to the bag region to exist between the side edge seals or continuously with a steady state foam material volume output with the compressing vertical side edge sealer in the first station area acting as a creamy foam material dividing means upon pinching the film material between its heating ribbon and heat absorption backing member. The former is preferred for most sealing apparatus to avoid seal disruption. Because the foam bags are confined in location between the vertical side edge sealers, the sealers can actually perform a cutting operation preferably timed so that the vertical edge sealer moving up to the downstream end of the conveyor heats up so as to cut the first in bag for easy release from the upstream chain of bags.

FIG. 15 further illustrates the placement of die impressions 402 directly on the conveyor belt 404 such that the die impressions 402 stay in continuous contact with the cushion they first make contact with during indexing of the cushions along the backboard 22 by conveyor system 408. FIG. 16 illustrates the forming of conveyor 408 with a relatively large radius driving roller (e.g., 4–12 inch radius roller) so as to lessen the degree of deflection required for die impression 402 at the ends of the conveyor. Because die impression 402 is required to be sufficiently flexible to conform to the conveyor's curved end paths and provide the impression function, a highly flexible, relatively dense polymer of plastic or rubber such as silicone rubber or a polyurethane elastomer compound is preferably the material from which the impression dies are formed. In a preferred embodiment, the die impressions are formed of an elastomer polyether polyurethane that has pliability properties sufficient to expand or contract at a 45° angle with respect to the curved end of the conveyor utilized. Also, the flexible dies can be either permanently fixed or releasably, securely fastened to the conveyor by matching patches of Velcro provided on the conveyor outer surface and the bottom surface of the dies, or magnetic sheeting 410 provided on the interior side of the conveyor and attracting metal sheeting or solid ferromagnetic units at the bottom of the dies to achieve releasable securement, etc. FIG. 16 also illustrates providing a conducting bus ring 412 spaced inward from the upper edge of the conveyor and along which conductor 414 of the vertical side edge sealer runs along.

FIG. 17 illustrates an above positioned vent forming means 416 having first and second vent forming devices 418,420 supported on suspension arm 422 supported by backboard 22 and extending across toward conveyor belt 404. In one embodiment, vent forming devices 418, 420 are solenoid rods with either a puncture and slicing blade or a heater cartridge provided at the end for insertion into the upper region of the cushion (either between the upper edge seal and backboard or between the upper edge sealer and conveyor belt or both locations).

FIG. 18 shows a cut-away cross-sectional view of a portion of conveyor system 408 shown in FIG. 15 with conveyor sheet 404 supporting a protruding die impression and being is sliding contact with interior slide member 405 which preferably is a stationary panel having a smooth surface over which the more flexible conveyor sheet slides and which extends between the rollers in much the same way a conveyor belts slides over the support surface of a treadmill exerciser. The stationary slide member helps avoid an over inward flexing of the more flexible conveyor belt while the belt provides a compressive influence on the cushion bag positioned between the conveyor and backboard.

Rather than relying on flexible die impression members, the present invention also features the use of die impression that are solid or of not sufficiently flexible material to meet the 45° degree parameter noted above. For example, relatively solid die impressions of molded, relatively hard plastic or metal or carved wood impressions are suitable.

These solid die impressions can also be mounted on the conveyor in a variety of ways such as with ball and socket assembly 501, shown in FIG. 18 as having one component (ball extension 505) mounted at a mid region of the back of die impression 503, and a second component (ball socket cup 507) mounted to conveyor sheet 404. A hinge structure can also be used either centrally positioned as ball and socket assembly 501 or positioned on opposite sides of the die impression in suitable fashion to rotate and expand to accommodate the curvature of the conveyor ends. Another embodiment (not shown) features a solid die impression formed of a plurality of adjacent thin vertical strips that are bonded or otherwise joined to the conveyor in book binder fashion whereby the individual mold section strips are free to spread apart or come together in book page like fashion during the travel of the die impression along the conveyor path.

FIG. 19 illustrates another die impression embodiment that can move together with the conveyor belt like die impression 402 in FIG. 18. As shown in FIG. 19, conveyor belt 404 is provided with an external, flexible laminate 408 having a continuous surface 409, except for a plurality of recesses 410. FIG. 20 illustrates an example of a cushion bag produced using the die impression embodiment of FIG. 19 which has a plurality of protrusions 414 corresponding to the die impression's recesses 410. Thus, the arrangement of the present invention provides for great flexibility in the final configuration of the foam bag cushion in that, not only can there be formed recessed areas in a cushion bag, but also protrusions or a combination of protrusions and depressions (e.g., extending areas of laminate 408 outward from surface 409 toward the cushion).

FIG. 21 further illustrates the flexibility of the present invention in forming desired foam cushion shapes. As shown in FIG. 21, the indexing means used to index the tS cushions and maintain the cushions in a constant compression state with respect to the adjacent backboard can be provided of different thicknesses along its length, either by increasing the thickness of a general laminate as shown in FIG. 19, or by having individual panels (421, 423, 425 . . .) that have hinged sides (e.g., added hinge elements 426, or thinned adjoining area or a flexible thin strip laminate) which enable the panels to come together along a general common plane (e.g., common backwall plane) adjacent and parallel to the backboard and then expand to conform to the curved conveyor ends. Preferably, the hinge arrangement used to join the individual panels allows for removal and reinsertion of different configured or thickness panels. With the arrangement of FIG. 21, a series of cushions with different surface contours (420, 422, 424) and thicknesses (e.g., T1, T2, T3) can be formed in repeating sequence such as a bottom cushion, four different side cushions, and a top cushion whereby an operator can quickly perform a packing operation for one package in sequence as the corresponding cushions are output to correspond with the different package wall and adjacent product surface combinations, which may require different bag cushion thicknesses.

While the above described embodiments have been made in reference to a single conveyor/backwall combination, the present invention also features various other to combinations such as a pair of conveyors, rather than the conveyor/backwall combination. A pair of conveyors facilitates an arrangement where each conveyor supports a series of die impressions either for forming different die impressions on opposite sides of the same cushion (e.g., note the applicability of such an arrangement for forming packing for the clock in FIG. 12) or, through appropriate die impression spacing on the respective supporting conveyors, alternating the bag side in which the impression is formed which can facilitate an operator's proper positioning of a cushion in a package and also provides an added degree of flexibility in a bag forming system's providing of different impression bag designs. The impression forming and cushion expansion limiting means of the present invention can also take on alternate forms such as the above noted conveyor/backwall combination together with a chain or track die impression series (either continuous or repeated straight line series preferably with retraction means to avoid an indexing disruption) that can shift along the backwall side wall by way of conveyor movement and/or by way of an independent driving system so as to maintain die impressions in proper position with respect to the curing foam bodies.

Figure 22:
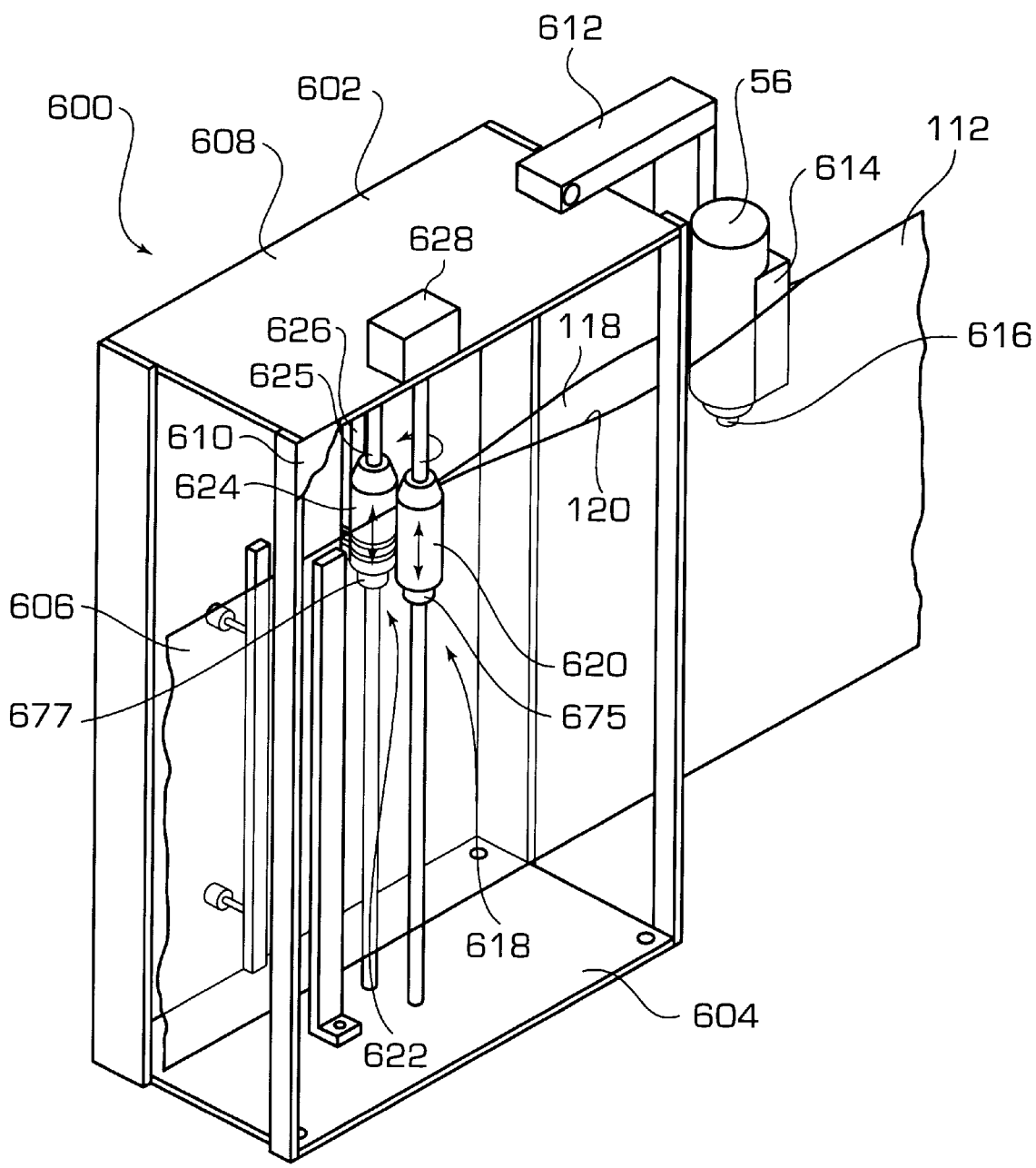
FIG. 22 shows a cut-away perspective view of embodiments of the bag fill, vent and sealing assemblies of the present invention.

FIG. 22 illustrates, in partially cut away fashion, an upstream bag filling and formation assembly 600 that is particularly well suited for use with a dual, spaced conveyor system in view of its stand alone support structure, although it is also well suited for use with the other described embodiments upon making the appropriate modification (e.g. having a backwall that does not extend out from the upstream end of the conveyor and does not support the sealing and venting means) or meeting the required positioning requirements by extending the backwall internally of the stand alone support structure 602 (with either or both providing support to the sealing and venting means). The stand alone support structure can also represent one segment of a larger system encasing structure which encompasses essentially the entire conveyor system. While support structure 602 can assume a plurality of different designs, one preferred embodiment features base 604, back wall 606 and top cover 608, and preferably front wall 610 (only partially shown for added clarity). Provided on top cover 608 is dispenser support unit 612, which is preferably an L-shaped member joined at its lower end to dispenser 56 and pivotably supported at its upper end to cover 602 for easy repositioning during servicing of the dispenser or system components internal to the enclosure 602.

As shown in FIG. 22, dispenser assembly 56 is positioned in line with film section 112 such that the individual film sheets diverge outward around the dispenser to provide an opening in the C-fold film into which the foam material can be dispensed. To facilitate the opening up of the film sheets, diversion block 614 is mounted on the upstream end of the dispenser's cylindrical main body. Diversion block includes a relatively sharp edge front surface and diverging side walls that act to spread the film apart before the film reaches dispenser outlet 616. Film types other than the C-fold type can also be used in the system, but the C-fold film is the most preferred because C-fold film provides an inherent closed, sharp edge bottom. For example, a roll of tube film can be utilized, but such use is far less preferred as it requires the addition of a top cutter prior to the dispenser (e.g., an upstream blade supported on the dispenser or its support), or two separate sheets can be supplied to opposite sides of the dispenser from, for example, two separate roll supplies, but such is far less preferred as it requires an added lower edge seal means positioned upstream of the dispenser to close off the bottom of the to be formed bag prior to foam material receipt.

Figure 23:
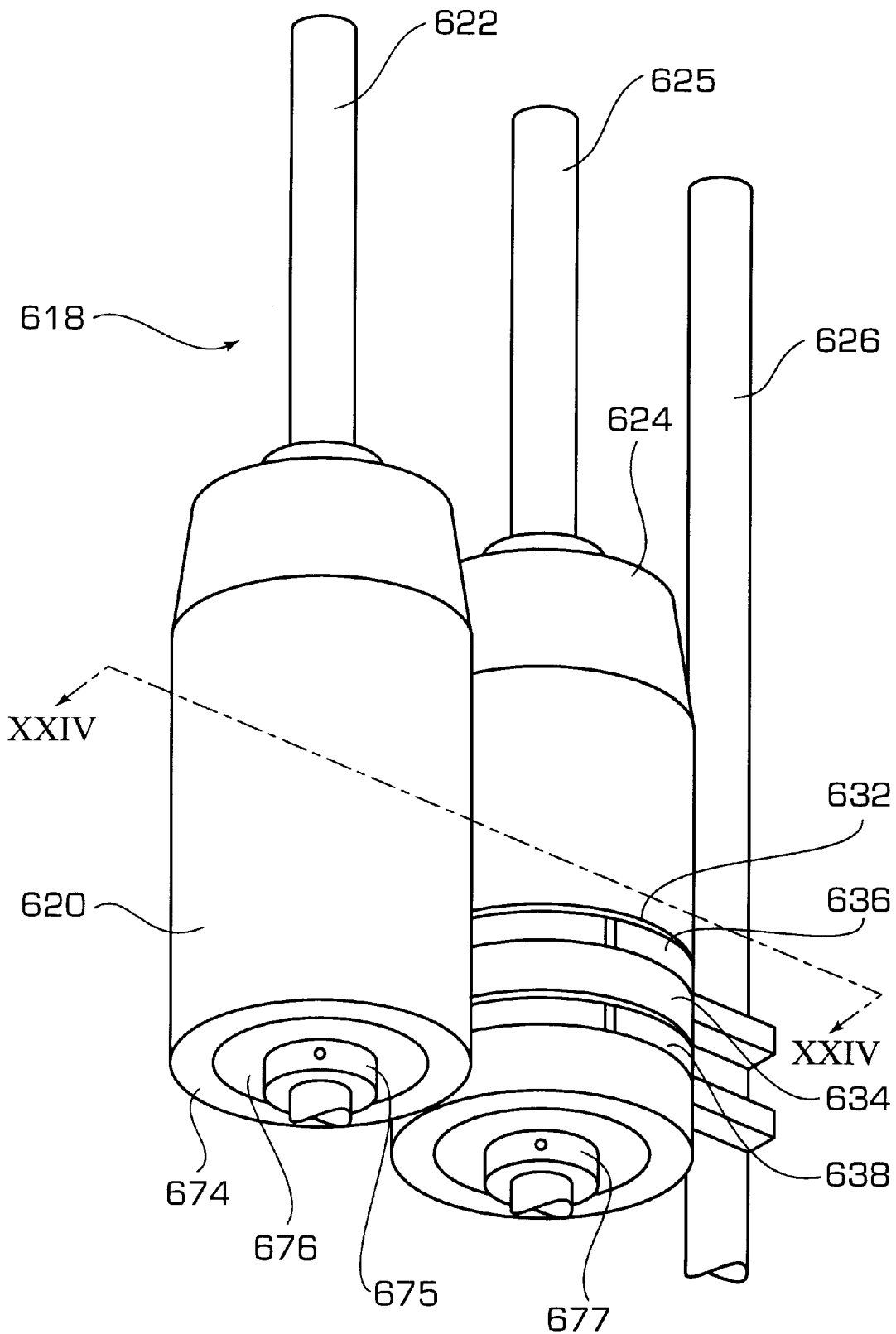
FIG. 23 shows a close up view of the upper edge sealer and venting assemblies and roller supports shown in FIG. 22.

With reference to FIGS. 22 and 23 in particular, upper edge seal and vent formation assembly 618 are now described. Assembly 618 comprises compression roller 620 rotatably supported by shaft 622, sealing device support roller 624 rotatably supported by support shaft 625, and positioning shaft 626. Each of shafts 622, 625, 626 extend between the supporting top cover 608 and base 604 to provide stability to the enclosure and to provide a wide range of vertical adjustment in rollers 620,624. This adjustment is made possible by loosening a set screw on collars 675 and 677 to place rollers 620 and 624 at a height commensurate with the upper edges 118, 120 of film section 112 such that those edges are in a pinching relation between rollers 620 and 624 during operation. With the appropriate height adjustment of rollers 620, 624 the desired bag height can be formed within a range limited only by the height of the current roll in the system (which can be changed) and the top cover of the enclosure (which can be initially made to suit all anticipated uses).

As in the system described for U.S. Ser. No. 09/076,087, compression roller 620 has an outer covering 628 of a compressible material such as silicone rubber that is placed in a compression state with respect to similarly sized roller 624. Rollers 620 and 624 are preferably in a passive arrangement wherein the downstream bags remain attached together while passing through the conveyor system so that the conveyor or downstream moving means represents the sole means for pulling the upstream film material through the non-driven rollers 620 and 624, although a non-passive arrangement is also possible wherein one or both of rollers 620 and 624 rotate to either provide the sole means for supplying the partially formed bag cushion to the conveyor (e.g., a situation wherein the bags are separated by the side edge sealer 78 and pass individually through the conveyor system and the drive roller(s) act to load the conveyor with a first station bag) or can supplement the conveyor feed or provide an upper edge tensioning function for facilitating seal formation based on relative rotation speed in conjunction with the conveyor(s) pulling of a chain of sealed bags through the conveyor. From the standpoint of avoiding added complexity, it is preferable to utilize a passive system when not required to draw the film material to load the first station due to the non-use of a chain of bags downstream.

FIG. 22 illustrates a non-passive system wherein roller 620 is keyed or otherwise locked to shaft 622 and driven by motor 628 in the direction illustrated by the arrow shown in FIG. 22. In a passive roller arrangement, rollers 620 and 624 are supported by their respective shafts by way of a bearing unit that allows free rotation of each of the rollers respect to the corresponding fixed supporting shaft.

Figure 25:
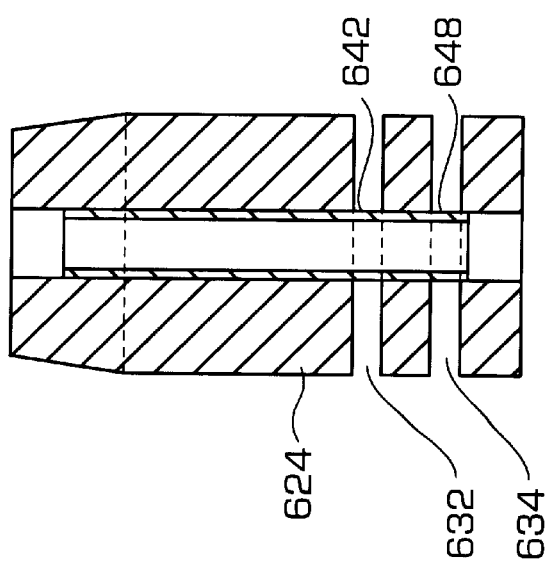
FIG. 25 shows a cross-sectional view of the support roller for the vent and upper edge seal inserts.

As shown by FIGS. 23 and 25, roller 624 is a metal roller that has two axially spaced, annular recesses 632, .634 formed therein with the upper recess 632 positioned to receive upper edge sealer 636 and the lower recess 634 positioned to receive vent former 638. Preferably, upper edge sealer 636 and vent former 638 are inserts similar to those described in U.S. Ser. No. 09/076,087, one embodiment of which is shown in FIG. 26.

Figure 26:
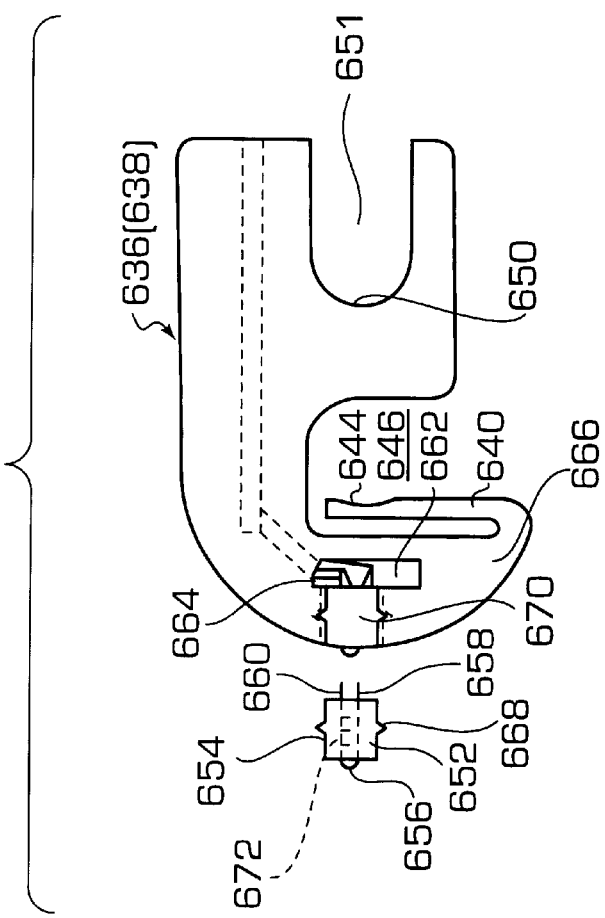
FIG. 26 illustrates one possible embodiment for the inserts of FIG. 23.

FIG. 26 illustrates upper edge sealer 636, which is preferably the same as vent former 638 so that the inserts are interchangeable. Upper edge sealer 636 includes plug-in heat unit 652 having plug-in housing 654 supporting exposed heat element 656 and fairly rigid plug prongs 658, 660 (similar to an automotive fuse arrangement). Plug prongs 658, 660 are plugged into corresponding plug receptors 662 and 664 to provide a continuous heating element circuit. Plug receptors 662, 664 are formed either integrally within main body 666 of edge sealer 660 or a receptor unit can be slid into place with its attached wires. Fastened plug-in heat unit 652 can be held simply by light friction (reception cavity in main body 660 and plug receptors 662, 664) or additional holding means such as deformable projections 668 can be utilized. FIG. 26 shows the final resting position by dashed lines. As it is the heat element portion of the insert that is prone to wear out first, this arrangement greatly simplifies replacement of the heating element in a minimal amount of time to avoid production delays. Also, no tools are needed as reception chamber 670 in main body 666 can have an at least partially exposed side wall section which allows finger contact with a friction enhanced grooves 672 along a common side of plugs-in unit 652 to facilitate slide out removal similar to battery cover removal in some battery operated devices.

Each insert 636 and 638 includes first notch 646 which is partially defined by spring lever 640 having concavity 644 formed therein. The notch 646 is sized such that each insert can be slid over a respective one of annular rings 642 and 648 formed in roller 624 which causes spring lever 640 to deflect inwardly even when the annular ring is received in position holding concavity 644. In this way, the heating element has a degree of floating adjustment capability and also is biased forward to exert pressure on the film being passed by the heating element. At the rear of each insert is cutout 650 defining notch 651 which is dimensioned to receive spacing shaft 626 in contacting fashion so that the insert is precluded from rotation about the supporting annular ring of roller 624.

Figure 24:
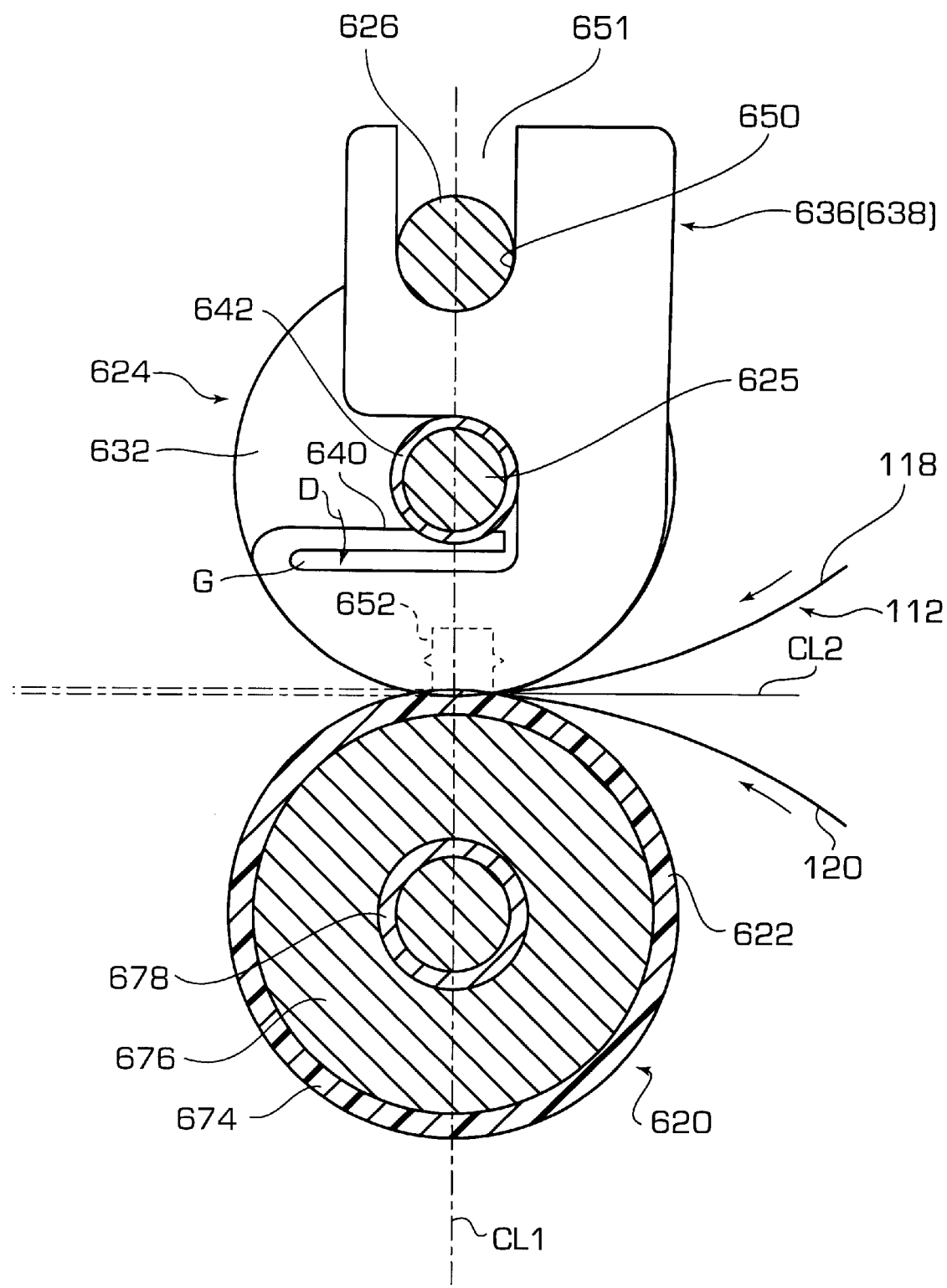
FIG. 24 shows a cross-sectional view along cross-section line XXIV—XXIV of FIG. 23 together with an illustration of film feed.

FIG. 24 provides a cross-sectional view taken along cross-section line XXIV—XXIV of FIG. 23 together with a view of the film material feed through the rollers 620, 624. As shown in FIG. 24, upper film edges are returned, following their divergence around the upstream dispenser, into a contacting relationship along center line CL2 passing through the contact point of rollers 620 and 624. At the center of this contact point is positioned heating element 656 of cartridge 652 in a compression state due to the deflection D of lever 640 into gap G. FIG. 24 also illustrates compression coating or covering 674 of roller 624 which surrounds a metallic main roller body 676 with the latter receiving bearing sleeve 678 surrounding shaft 622. Each of shafts 622, 625, 626 are aligned along center line C1 as is heating element 656.

In a different embodiment of the invention, a deflector (e.g., an additional roller) is provided to force upper edge 118 of film material 112 into contact with the upstream circumference of roller 624. In this way, rather than two inserts, a single insert can be used that has two heating elements with one closer to the upper edge of the horizontally extending insert than the other to form the upper edge seal. The lower positioned heating element for forming the vent is also spaced circumferentially upstream with respect to film travel, so as to be heated sufficiently to cut a vent hole in the film while not disrupting to an appreciable extent the temperature level of the downstream upper seal forming apparatus.

FIG. 27 illustrates an additional embodiment of a foam bag cushion forming system 700 of the present invention with one half of the cushion expansion space defining means (e.g., one of two conveyors) removed for added visibility of the chain of bags 702. As shown in FIG. 27, film material section 706 of roll 704 of C-fold film extends initially in side-to-side contact and is then diverted with diverter 708 around dispenser 710. Positioned immediately downstream of dispenser 710 (e.g., within 6 inches of its outlet and more preferably within 3 inches) is a first vertical edge sealing heat element 712 (e.g., a heat resistant ribbon ⅟₁₆th of an inch in width) of vertical edge sealer 714. First vertical edge sealing heat element 712 extends parallel to second vertical edge sealing heat element 716 with element 716 positioned just downstream (e.g., within 3 inches of each other and more preferably 1 to 2 inches apart) of element 712. Elements 712 and 716 are supported on a common frame structure 718 which is connected for means for reciprocating the heat elements into and out of sealing contact with the film material fed in front of them. In this way, a pair of vertical side edge seal beads 720, 722 are formed with each pair defining a bag chain link section 724 and with bags 726 of length B being defined by bead 720 of an upstream set and bead 722 of a downstream set. The spacing between beads 720 and 722 within a common set (of 1.5 inches or so) provides a degree of tolerance in the downstream separation of the bags when using a cutter such as cutter 86 shown in FIG. 1.

The upper edge sealer arrangement of the system shown in FIG. 27 is similar to that shown in FIG. 22 in that a first roller (hidden from view in FIG. 27) provides support to an upper edge seal insert such as that shown in FIG. 26 with compression roller 728 being similar to its counterpart 620 in FIG. 22. For reasons which become clearer below, one difference between the roller support system in FIG. 27 and that in FIG. 22 is that the support roller for the upper edge seal does not include a support recess for a vent cut insert since venting is carried out in a different fashion as described below. A comparison with the arrangement of FIG. 22 and the arrangement of FIG. 27 further reveals a reversal of the relative position of the vertical side edge sealer and the upper edge sealer used in each system. That is, vertical side edge sealer 714 in FIG. 27 is positioned between the upper edge sealer and dispenser rather than the upper edge sealer being positioned between the vertical side edge sealer and the dispenser.

Venting in the system 700 is achieved by having the heating elements 712 and 716 form seal beads 720 and 722 of height "h" which is less than the height "H" (e.g., ¼ inch to 3 inch difference) for the upper edge seal. Upper edge seal 730 is also typically spaced just below upper free edges F of the non-bonded C-fold sections, although that depends on the set position of the height adjustable insert support roller and compression roller 728 along their respective shafts (only one of two represented by 732) as discussed above for the FIG. 22 embodiment.

FIG. 28 illustrates in greater detail bag chain 725 of FIG. 27 with an added depiction of the foam material received in bags 726 from dispenser 710. As shown in FIG. 28, foam material 727 exits dispenser 710 and makes initial contact on the bottom edge of the C-fold film within three inches (and more preferably within two inches) of side seal bead 722 of the yet-to-be-completely formed bag at station ST1 because the dispenser's outlet axis is preferably within three inches of seal bead 722 as represented by distance D1. Thus, a continuous bead 731 of essentially constant pre-expansion height foam 731 is introduced along the bottom of the C-fold film being drawn past the dispenser. The foam material is preferably discontinued when the outlet axis reaches a similar distance D1 from the location of the to-be-formed right seal so that the bead of foam comes within about 2 inches of the adjacent seal bead. In the embodiment illustrated in FIG. 28, the bag length is commensurate with the index distance required to move bag 729, which just has been filled in the last controlled dispenser output and has just had its right edge seal R formed by vertical edge sealer 714, to a confinement location behind edge E of conveyor 717. That is, immediately following the foam dispensing, the right seal R is formed and the bag is the immediately shifted so as to place right edge seal R at the location previously occupied by its left seal L located downstream from conveyor end E. Commensurate with the indexing of the right seal R from the location shown in FIG. 28 toward the position currently occupied by the left seal L, foam is dispensed to form bead 731. As also shown in FIG. 28, foam bead 731 expands somewhat while the dispenser operates to complete formation of the foam material bead and during the brief reciprocation of the vertical edge sealer (as presented by foam level 733) and then slightly more during the indexing of bag 729 over to its confinement location (as presented by foam level 735). The arrangement and efficient operation of the present invention provides that the foam level 735 initially inserted between the conveyors or the like, is preferably less than 25% of the full expansion height or volume and even more preferably less than 10% of the full expansion height or volume such that the compression of already formed cells is avoided. Depending on the length of the conveyor 717 with respect to bag length and foam rise rate, a dwell extension may be required. FIG. 28 illustrates the result of a dwell extension wherein the full dwell period resulted in about a 75% expansion state (which would allow for certain die impression applications).

FIG. 28 also illustrates the unique venting arrangement of the present invention wherein vent channel 739 is formed and comprised of a plurality of vents 741 with each of the vents formed by having the vertical side edge seals not extend all the way up to the continuous upper edge seal 730. Reaction exhaust gas thus is allowed to flow in an upstream direction through the vents until release at a point upstream of the upper edge sealer since the upper edge seal is not yet present there. With the exception of the most upstream vent, any foam material escaping through one of the vents 741 has an opportunity to settle on the foam material of an upstream, receiving bag so as to avoid having each of the bags ejecting some amount of foam material intermingled with the vented gas. This provides for a highly efficient use of foam precursor material and also helps lessen system contamination due to foam spraying out from a plurality of exhaust vents.

Although the present invention has been described with reference to preferred embodiments, the invention is not limited to the details thereof. Various substitutions and modifications will occur to those of ordinary skill in the art following a review of this application, and all such substitutions and modifications are intended to fall within the spirit and scope of the invention as defined in the appended claims.

What is claimed is:

1. A foam bag cushion forming system, comprising:
a foam bag cushion movement and confinement assembly extending downstream of a foam dispenser source, and said foam bag cushion movement and confinement assembly being of a length sufficient to provide for substantial curing of the dispensed foam material,
an edge sealing assembly for forming film material into a bag chain, which bag chain is received by said foam bag cushion movement and confinement assembly, and moved by said bag cushion movement and confinement assembly in an upstream to downstream direction while being confined, wherein
said edge sealing assembly includes an end edge sealer that forms an edge seal in the film material and a side edge sealer which forms side edge seals in the film material, and said end edge sealer is supported by an adjustable support to provide for a variation in bag height, and said foam bag cushion forming system further comprises control means for providing a predetermined spacing between side edge seals such that bag length is adjustable, and wherein said end edge sealer includes an adjustable in height roller support, a setting member and a sliding shaft, with the roller support being slidably received by said shaft and retained at a height setting by said setting member, and said end edge sealer includes an insert with heating element that is slidably received by said support roller.

2. A system as described in claim 1 wherein said end edge sealer forms a continuous seal in the bag chain and said side edge sealer forms side edge seals that include a vent space for channeling foam reaction exhaust gases along the bag chain.

3. A system as described in claim 2 wherein said side edge sealer forms a continuous side edge seal from one end edge of the film material being formed into a bag chain to a location short of said end edge seal so as to define the vent for channeling gas through the bag chain.

4. A system as described in claim 1 wherein said side edge sealer forms side edge seals that each include a spaced pair of seal beads which define a chain-link area in said bag chain.

5. A system as described in claim 4 further comprising a bag chain cutter which operates to separate individual bags from said bag chain by separation within the chain-link area.

6. A system as described in claim 1 further comprising a foam material dispenser and a film supply assembly which positions film material having a C-fold configuration in a foam material reception position with respect to said dispenser.

7. A system as recited in claim 6 wherein said foam bag cushion movement and confinement assembly is positioned downstream of said dispenser and represents means for drawing film material from said supply assembly and past said edge sealing assembly.

8. A system as recited in claim 7 wherein said foam bag cushion movement and confinement assembly represents the sole means for drawing film from said film supply assembly and past said edge sealing assembly.

9. A system as recited in claim 7 wherein said foam bag cushion movement and confinement assembly includes an elongated conveyor and an adjacent space confinement member.

10. A system as recited in claim 9 wherein said conveyor is vertically oriented and the film material supply assembly directs C-fold film having a bottom fold and two separated film sections with respective free edges past said dispenser having an outlet axis with a vertical component for supplying foam to an internal area of the C-fold film.

11. A system as recited in claim 10 where said end edge sealer forms an upper edge seal in the film material opposite to a preformed, fold edge of the C-fold film material and said side edge sealer forms spaced, vertical side edge seals in the C-fold film material to define bag lengths.

12. A system as recited in claim 1 further comprising a dispenser positioned upstream of the foam bag cushion, movement and confinement means and wherein said foam bag cushion movement and confinement assembly includes a vertically oriented conveyor and said side edge sealer is positioned so as to form a first vertical side edge seal which is downstream and within six inches of an outlet of the dispenser.

13. A system as recited in claim 12 further comprising control means for controlling dispenser output such that the bottom of the to-be-formed bag receives an essentially continuous bead of pre-expansion foam material of essentially equal pre-expansion height from within 3 inches of said first vertical side edge seal to 3 inches of a second vertical side edge seal positioned upstream of said first vertical side edge seal.

14. A system as recited in claim 1 further comprising die impressions supported by said foam bag cushion movement and confinement assembly.

15. A system as recited in claim 14 wherein said foam bag cushion movement and confinement assembly includes a conveyor and said die impressions are supported and move with the conveyor.

16. A system as recited in claim 15 wherein said die impressions are adjustably supported by said conveyor so as to adapt to straight and curved sections of the conveyor.

17. A foam bag cushion forming system comprising:

a foam bag cushion movement and confinement assembly extending downstream of a foam dispenser source, and said foam bag cushion movement and confinement assembly being of a length sufficient to provide for substantial curing of the dispensed foam material;

an edge sealing assembly for forming film material into a bag chain, which bag chain is received by said foam bag cushion movement and confinement assembly, and moved by said bag cushion movement and confinement assembly in an upstream to downstream direction while being confined;

die impressions supported by said foam bag cushion movement and confinement assembly, wherein said foam bag cushion movement and confinement assembly includes a conveyor and said die impressions are supported and move with said conveyor, wherein said die impressions are adjustably supported by said conveyor so as to adapt to straight and curved sections of the conveyor;

and wherein said die impressions are formed of a flexible material that has pliability properties sufficient to expand and contract at a 45° angle with respect to the curved section of the conveyor.

18. A system as recited in claim 17 wherein said foam bag cushion movement and confinement assembly includes a vertically oriented moving member and a stationary member spaced from said moving member and extending parallel therewith.

19. A foam bag cushion forming system, comprising:

a foam bag cushion movement and confinement assembly extending downstream of a foam dispenser source, and said foam bag cushion movement and confinement assembly being of a length sufficient to provide for substantial curing of the dispensed foam material;

an edge sealing assembly for conforming film material into a bag chain, which bag chain is received by said form bag cushion movement and confinement assembly, and moved by said bag cushion movement and confinement assembly in an upstream to downstream direction while being confined, die impressions supported by said foam bag cushion movement and confinement assembly, wherein said foam bag cushion movement and confinement assembly includes a vertically oriented moving member and a stationary member spaced from said moving member and extending parallel therewith, and wherein said die impressions are supported on said stationary member and shifted by shifting means into and out of a space located between said stationary and moving member.

20. A system for forming foam bag cushions from film material, comprising:

a C-fold film material supply assembly;

a dispenser positioned for dispensing foam material into an opened section of the C-fold film material supplied by said supply assembly;

a seal assembly which includes an upper edge sealer and a vertical side edge sealer which together form a bag from the film material, with the foam material being contained in the bag so as to provide for a foam bag cushion;

a first elongated member, and a second elongated member spaced from said first elongated member so as to define a cushion expansion and curing space therebetween, said first and second elongated members being positioned downstream from the dispenser so as to receive at least partially formed bags prior to foam set up in the foam bag cushions;

wherein one of said elongated members includes moving means for passing the foam bag cushions received at one end of the first and second elongated members to an opposite end of said elongated members;

wherein said moving means includes a conveyor and said seal assembly forms a continuous bag chain that is at least partially received by said elongated members and which is directed through said foam bag cushion forming system by said conveyor, and wherein said vertical side edge sealer is supported in said system as to move with the conveyor.

21. A system as recited in claim 20 further comprising die impressions that are supported by said conveyor.

22. A system as recited in claim 20 further comprising die impressions that are supported on at least one of said elongated members so as to form impressions or protrusions in the foam bag cushions received between said elongated members.

23. A system as recited in claim 20 wherein said upper edge sealer forms a continuous upper edge seal in the film material and said bag forming system comprises a plurality of spaced apart vertical side edge sealer elements that are supported in said system so as to move with the conveyor and which together form a plurality of spaced vertical edge seals each having an end that initiates below the upper edge seal so as to define a plurality of vents between the foam bag cushions which vents together constitute a vent channel.

24. A system as recited in claim 20 wherein said upper edge sealer and vertical side edge sealer form a plurality of linked bag cushions that define a bag chain which bag chain is an uninterrupted extension of the C-fold film material provided by the film material supply assembly, and wherein said upper edge sealer is supported by a height adjustable support for varying bag cushion height and said bag forming system includes means for controlling the feed out of film from said film material supply assembly and means for controlling the timing of vertical side edge seal formation such that bag length is adjustable as well as height.

25. A system as recited in claim 20 wherein said vertical side edge sealer includes means for forming pairs of vertical side edge seal beads defining a chain link section therebetween, and said foam bag cushion forming system further comprising separation means for separating or facilitating separation of said bag cushions in said bag chain along a location within said chain link section.

26. A system as recited in claim 20 comprising a plurality of spaced apart vertical side edge sealer elements that are supported in said system so as to move with the conveyor.

27. A bag forming system, comprising:

a bag movement and confinement assembly;

an edge sealing assembly comprising a bag side edge sealer and a bag end edge sealer, wherein said end edge sealer includes an adjustable in height roller support, a setting member and a sliding shaft with said roller support being slidably received by said shaft and retained at a height setting by said setting member, and said end edge sealer also including a sealing element received by said roller support.

28. A foam bag cushion forming system, comprising:

a foam bag cushion movement and confinement assembly extending downstream of a foam dispenser source, and said foam bag cushion movement and confinement assembly being of a length sufficient to provide for substantial curing of the dispensed foam material;

an edge sealing assembly for conforming film material into a bag chain, which bag chain is received by said foam bag cushion movement and confinement assembly, and moved by said bag cushion movement and confinement assembly in an upstream to downstream direction while being confined, wherein said foam bag cushion movement and confinement assembly includes a conveyor, and said foam bag cushion forming system further comprising a die impression positioned on the conveyor and made of a flexible material that has pliable properties sufficient to expand and contract at a 45° angle with respect to a curved section of said conveyor.

29. A foam bag cushion forming system, comprising:

a foam bag cushion movement and confinement assembly extending downstream of a foam dispenser source, and said foam bag cushion movement and confinement assembly being of a length sufficient to provide for substantial curing of the dispensed foam material, an edge sealing assembly for conforming film material into a bag chain, which bag chain is received by said foam bag cushion movement and confinement assembly, and moved by said bag cushion movement and confinement assembly in an upstream to downstream direction while being confined, wherein said bag cushion movement and confinement assembly includes a vertically oriented moving member and a stationary member spaced apart from the vertical member, and wherein the stationary member is provided with die impressions and a shifting assembly that shifts said die impressions into and out of a space located between the stationary and moving members.

* * * * *